US011271831B2

(12) United States Patent
Patil et al.

(10) Patent No.: US 11,271,831 B2
(45) Date of Patent: *Mar. 8, 2022

(54) PROACTIVE AND INTELLIGENT PACKET CAPTURING FOR A MOBILE PACKET CORE

(71) Applicant: Cisco Technology, Inc., San Jose, CA (US)

(72) Inventors: Santosh Ramrao Patil, Santa Clara, CA (US); Abhishek Dhammawat, San Jose, CA (US); Gary Boon, Ontario (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,147

(22) Filed: Jan. 15, 2020

(65) Prior Publication Data
US 2020/0280499 A1 Sep. 3, 2020

Related U.S. Application Data

(63) Continuation of application No. 16/288,578, filed on Feb. 28, 2019, now Pat. No. 10,567,245.

(51) Int. Cl.
*H04L 12/26* (2006.01)
*H04L 43/04* (2022.01)
(Continued)

(52) U.S. Cl.
CPC ............ *H04L 43/04* (2013.01); *H04L 41/142* (2013.01); *H04L 41/147* (2013.01);
(Continued)

(58) Field of Classification Search
CPC ....... H04L 43/10; H04L 43/04; H04L 41/142; H04L 43/0835; H04L 41/147;
(Continued)

(56) References Cited

U.S. PATENT DOCUMENTS 7,975,262 B2  7/2011  Cozmei
8,493,870 B2  7/2013  Calippe et al.
(Continued)

OTHER PUBLICATIONS

Yangyang Wang et al., "A tool for tracing network data plane via SDN/OpenFlow", Science China Press and Springer-Verlag Berlin Heidelberg 2016, vol. 60 022304:1-022304:13, doi: 10.1007/s11432-015-1057-7, Feb. 2017, 13 pages.
(Continued)

*Primary Examiner* — Benjamin H Elliott, IV
(74) *Attorney, Agent, or Firm* — Edell, Shapiro & Finnan, LLC

(57) ABSTRACT

Techniques that provide proactive and intelligent packet capturing are described herein. In one embodiment, a method includes storing information associated with a plurality of user equipment (UE) sessions of a plurality of UEs within a mobile network; detecting an anomaly associated with at least one UE session of at least one UE based, at least in part, on the information stored for the at least one UE session; and activating a trace for the at least one UE session based, at least in part, on detecting the anomaly associated with the at least one UE session, wherein activating the trace comprises capturing packet information for a data packet flow associated with the at least one UE session at one or more data-path network elements of a plurality of data-path network elements within the mobile network.

20 Claims, 15 Drawing Sheets

(51) Int. Cl.
  *H04L 41/142* (2022.01)
  *H04L 43/0829* (2022.01)
  *H04W 72/04* (2009.01)
  *H04L 41/147* (2022.01)
  *H04L 67/146* (2022.01)

(52) U.S. Cl.
  CPC ........ *H04L 43/0835* (2013.01); *H04L 67/146* (2013.01); *H04W 72/048* (2013.01)

(58) Field of Classification Search
  CPC ..... H04L 67/146; H04L 43/026; H04L 69/22; H04L 67/14; H04W 72/048; H04W 24/08; H04W 24/02
  See application file for complete search history.

(56) References Cited

U.S. PATENT DOCUMENTS

| | | | |
|---|---|---|---|
| 9,389,992 | B2 | 7/2016 | Gataullin et al. |
| 9,772,927 | B2 | 9/2017 | Gounares et al. |
| 9,860,151 | B2 | 1/2018 | Ganichev et al. |
| 10,567,245 | B1* | 2/2020 | Patil ................ H04W 24/08 |
| 2003/0112800 | A1* | 6/2003 | Grech ................ H04L 43/12 370/389 |
| 2011/0188379 | A1* | 8/2011 | Calippe ................ H04L 41/12 370/241.1 |
| 2013/0232433 | A1 | 9/2013 | Krajec et al. |
| 2013/0294257 | A1* | 11/2013 | Gonzalez de Langarica .............. H04L 43/10 370/242 |
| 2014/0161120 | A1* | 6/2014 | Ikaheimo .......... H04M 15/8214 370/352 |
| 2015/0039747 | A1* | 2/2015 | Meloche ................ H04L 29/06 709/224 |
| 2016/0006840 | A1* | 1/2016 | Wenig ................ H04L 67/142 709/203 |
| 2016/0112847 | A1* | 4/2016 | Hyytiainen ............. H04W 4/12 455/458 |
| 2016/0147578 | A1* | 5/2016 | Biesack ................ H04L 67/02 719/328 |
| 2016/0204996 | A1 | 7/2016 | Lindgren et al. |
| 2016/0219065 | A1 | 7/2016 | Dasgupta et al. |
| 2017/0118616 | A1* | 4/2017 | Kothari ................ H04M 15/66 |
| 2017/0126475 | A1* | 5/2017 | Mahkonen .......... H04L 41/0631 |
| 2017/0279835 | A1 | 9/2017 | Di Pietro et al. |
| 2018/0019931 | A1* | 1/2018 | Jalan ...................... H04L 43/04 |
| 2018/0139086 | A1 | 5/2018 | Chakraborty et al. |
| 2018/0191471 | A1* | 7/2018 | Elhaddad .................. H04L 1/24 |
| 2018/0270134 | A9* | 9/2018 | Bansal ................ H04L 43/0817 |
| 2018/0278751 | A1* | 9/2018 | Stepanian ............. G06F 1/1626 |
| 2018/0295659 | A1* | 10/2018 | Shan .................... H04W 76/12 |
| 2020/0044931 | A1* | 2/2020 | Boon .................... H04L 43/028 |
| 2020/0280499 | A1* | 9/2020 | Patil ...................... H04L 41/142 |

OTHER PUBLICATIONS

J. Heinanen et al., "A Single Rate Three Color Marker", Network Working Group, Request for Comments: 2697, Category: Informational, Sep. 1999, 6 pages.

Sergio López Álvarez, "Anomaly Detection and Root Cause Analysis for LTE Radio Base Stations", Degree Project in Computer Science and Engineering, Second Cycle, 30 Credits Stockholm, Sweden 2018, Jul. 1, 2018, 56 pages.

3GPP Organizational Partners, "3rd Generation Partnership Project; Technical Specification Group Services and System Aspects; Telecommunication management; Subscriber and equipment trace; Trace data definition and management (Release 15)", 3GPP TS 32.423 V15.0.0, Jun. 2018, 93 pages.

3GPP Organizational Partners, "3rd Generation Partnership Project; Technical Specification Group Core Network and Terminals; General Packet Radio System (GPRS) Tunnelling Protocol User Plane (GTPv1-U) (Release 15)", 3GPP TS 29.281 V15.4.0, Sep. 2018, 32 pages.

\* cited by examiner

PROACTIVE AND INTELLIGENT PACKET CAPTURING FOR A MOBILE PACKET CORE

CROSS-REFERENCE TO RELATED APPLICATION

This application is a continuation of and claims benefit to U.S. patent application Ser. No. 16/288,578, filed Feb. 28, 2019, the entire contents of which are incorporated herein by reference.

TECHNICAL FIELD

The present disclosure relates to a mobile network, in particular, to proactive and intelligent packet capturing for a mobile packet core.

BACKGROUND

Mobile networking architectures have grown increasingly complex in communication environments, particularly in mobile wireless environments. Mobile communication networks have grown substantially in subscriber base as end users become increasingly connected to mobile wireless environments. As the number of mobile subscribers increases, efficient management of communication resources becomes more critical. In some instances, problems within network can cause network resources to become overloaded and can result in degraded user experience. Accordingly, there are significant challenges in managing network resources, particularly when problems occur in a network.

DESCRIPTION OF EXAMPLE EMBODIMENTS

Overview

Figure 1:
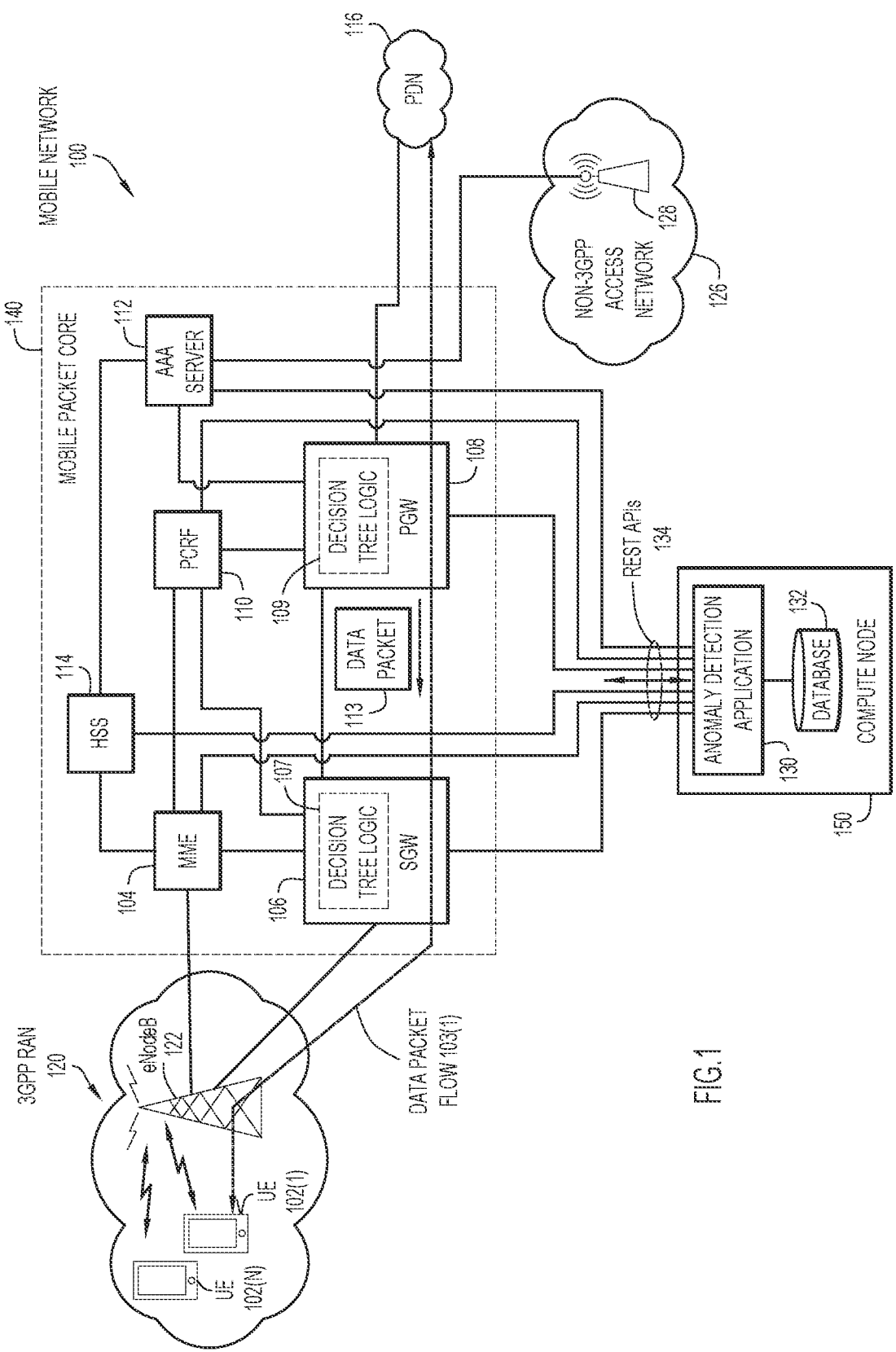
FIG. 1 is a simplified block diagram illustrating example details associated with a mobile network in which techniques that provide for proactive and intelligent packet capturing for a mobile packet core may be implemented, according to an example embodiment.

Presented herein are techniques to provide for proactive and intelligent tracing and packet capturing for a mobile packet core. A method is provided in one example embodiment and may include storing information associated with a plurality of user equipment (UE) sessions of a plurality of UEs within a mobile network; detecting an anomaly associated with at least one UE session of at least one UE based, at least in part, on the information stored for the at least one UE session; and activating a trace for the at least one UE session based, at least in part, on detecting the anomaly associated with the at least one UE session, wherein activating the trace comprises capturing packet information for a data packet flow associated with the at least one UE session at one or more data-path network elements of a plurality of data-path network elements within the mobile network.

In at least one embodiment, the detecting can further include detecting the anomaly associated with the at least one UE session by an anomaly detection application that is external to the plurality of data-path network elements in which the method may further include communicating the information associated with the plurality of UE sessions from a plurality of data-path network elements to the anomaly detection application via corresponding Representational State Transfer application programming interfaces (REST APIs) between each data-path network element of the plurality of data path network elements and the anomaly detection application. In at least one embodiment, activating the trace for the at least one UE session can further include communicating a trace activation notification to a first data-path network element from the anomaly detection application via a first REST API, wherein the first data-path network element is a packet data network gateway (PGW) and communicating a trace activation notification to a second data-path network element from the anomaly detection application via a second REST API, wherein the second data-path network element is a serving gateway (SGW).

In some embodiments, the detecting may further include predicting, at a first data-path network element, a potential anomaly associated with at least one other UE session, in which the predicting includes analyzing operational data associated with the at least one UE session using a decision tree associated with the at least one UE session configured for the first data-path network element; and determining one or more tracing related actions for the at least one UE session based on the analyzing. In still some embodiments, the method may further include communicating the one or more tracing related actions from the first data-path network element to a second data-path network element using a user plane General Packet Radio Service (GPRS) Tunneling Protocol (GTP-U) extension header of a GTP-U header of at least one GTP-U encapsulated data plane packet communicated from the first data-path network element to the second data-path network element.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) mobile network architectures, sometimes referred to as 4th Generation (4G)/LTE architectures, as well as 3GPP 5th Generation (5G) mobile network architectures. The following foundational information may be viewed as a basis from which the present disclosure may be properly explained.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element or node.

Compute node(s) having hardware and software resources that can be abstracted into one or more logical layers can be used to facilitate building and deploying Software Defined Network (SDN) architectures for virtualized network environments. Generally, SDN architectures provide an approach to building and deploying computer networks, networking equipment, and software that separates and abstracts the control plane and user plane of networking systems. SDN decouples the control plane that makes decisions about where traffic is sent from the underlying user plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor, memory, network interfaces, etc.), software and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters', and the like as used herein can refer to any type of binary, numeric, voice, video, textual, or script data or information or any type of source or object code, or any other suitable data or information in any appropriate format that can be communicated from one point to another using electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. As referred to herein and in the claims, the terms 'packet' and 'data packet' may be used interchangeably. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G mobile network architectures, user equipment (UE) devices typically connect to a service provider mobile packet core (e.g., 4G EPC) network through over-the-air communications with one or more radio nodes such as evolved Node Bs (eNodeBs or eNBs) for a 3GPP Radio Access Network (RAN), which interface with control plane elements such as Mobility Management Entities (MMES) and user plane elements such as Serving Gateways (SGWs) and Packet Data Network (PDN) Gateways (PGWs). As referred to herein and in the claims, the terms 'UE device', 'UE', 'mobile station', 'subscriber', 'UE/subscriber', 'user', and variations thereof can be used interchangeably.

In traditional 3GPP 4G mobile network architectures, user plane elements such as SGWs can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB hand-offs or handovers. Further for traditional 3GPP 4G architectures, PGWs may provide UE connectivity to external PDNs, such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like. 3GPP network elements such as MMES, PGWs, SGWs, etc. and/or elements that perform similar functionality to provide connectivity to one or more PDN Access Point Names (APNs) (e.g., the Internet, IMS, etc.) are often referred to collectively as the mobile packet core or EPC.

SDN concepts can be applied to a traditional 3GPP 4G architecture to enable separation of the control and user planes in order to implement a Control and User Plane Separation (CUPS) architecture in which the control and user paths are split across the two planes thereby creating a control plane (CP) implemented via one or more controller element(s) and a user plane (UP) implemented via one or more forwarding element(s) (FE(s)). For a 3GPP 4G CUPS architecture, the control plane element(s) can include any number of MMEs, control plane SGWs (referred to herein as SGW-Cs), and control plane PGWs (referred to herein as PGW-Cs) that manipulate the user plane network infrastructure to facilitate end-to-end service provider network connectivity. Also for a 3GPP 4G CUPS architecture, the user plane (UP) FE(s) can include any number of user plane SGWs (referred to herein as SGW-Us) and user plane PGWs (referred to herein as PGW-Us) that can process and perform operations on subscriber (e.g., UE) traffic as the traffic passes through the service provider network. In some embodiments, functionality for the SGWs and PGWs can be combined to provide a System Architecture Evolution Gateways (SAEGWs), which can be implemented in a CUPS architecture as control plane SAEGWs (referred to herein as SAEGW-Cs) and user plane SAEGWs (referred to herein as SAEGW-Us). Together, the control plane and user plane elements can manage the forwarding of all subscriber traffic through a service provider network.

For a 3GPP 5G mobile architecture, control plane elements can include, among other elements, an Access and Mobility Function (AMF) and a Session Management Function (SMF), and user plane elements can include User Plane Functions (UPFs), as defined in 3GPP standards. Generally, the AMF provides authentication, authorization, and mobility management for UEs, while the SMF is generally responsible for session management with individual functions being supported on a per-session basis in which the SMF allocates IP addresses to UEs, and selects and controls the UPFs for data transfer. The SMF also acts as the external point for all communication related to the various services offered and enabled in the user plane and how the policy and charging treatment for these services is applied and controlled. Other control plane elements may be implemented, as defined in 3GPP standards. The UPFs may operate as Virtualized Network Functions (VNFs) to serve as forwarding engines for user traffic and may perform a variety of functions such as shallow packet inspection, DPI, traffic optimization and inline services such as Network Address Translation (NAT)/Firewall/Domain Name System (DNS) snooping, QoS, among others that may be analogous to services provided by SGWs and PGW in 4G mobile network architectures.

Capture of packet data, as well as packet processing behaviors, often occurs when some negative event or failure condition is detected in a network element and is usually triggered by manual intervention (e.g., a support engineer initiating some form of packet trace or protocol monitoring). Unfortunately, because this intervention is reactionary, it fails to capture the chain of events leading to the event or failure. Much more insight into issues would be gained from being proactive rather than reactively capturing packets.

4G/5G mobile packet cores have some distinct characteristics which make them complex to debug and capture information proactively. Unlike WiFi systems in which a WiFi controller is the central intelligence system, 4G/5G mobile packet core nodes or network elements are distributed in nature and tracking subscriber information proactively across all nodes can be very complex and time-consuming. 4G/5G mobile packet core elements like MMES, PGWs, SGWs, etc. are designed to handle a massive scale of traffic/session management, services, etc.; therefore, running/enabling debugging information and packet capture on these nodes for all traffic handled by the nodes may have a significant impact on the processor and memory resources of these nodes due to high load of traffic. Hence, proactive and per-subscriber based selective enablement of debug information tracking and/or packet capture can be beneficial.

Example embodiments described herein provide techniques to overcome these hurdles by providing a mechanism to proactively and intelligently trace and capture packets and/or debug information, per-subscriber, in a 4G/5G mobile packet core system. Techniques described herein may provide for triggering proactive and intelligent tracing and packet capturing without manual intervention.

Referring to FIG. 1, FIG. 1 is a simplified block diagram illustrating example details associated with a mobile network 100 in which techniques that provide for proactive and intelligent packet capturing for a mobile packet core 140 may be implemented, according to an example embodiment. Mobile network 100 for the embodiment of FIG. 1 illustrates an example 4G/LTE mobile network architecture. Although the embodiment of FIG. 1 and other embodiments discussed herein may be described relative to a 4G/LTE mobile network architecture, it is to be understood that embodiments described herein may be implemented via any mobile network architecture, such as 4G CUPS mobile network architectures, 5G mobile network architectures (e.g., 5G Standalone (SA) and/or 5G Non-Standalone (NSA) architectures, as prescribed by 3GPP standards), any other next generation (nG) mobile network architectures, Wireless Local Area Network (WLAN) architectures (e.g., WiFi), any other communication architecture, and/or any combination thereof.

In at least one embodiment, mobile network 100 may include a 3GPP RAN 120, a Mobility Management Entity (MME) 104, an SGW 106, a PGW 108, a Policy and Charging Rules Function (PCRF) 110, an Authentication, Authorization, and Accounting (AAA) server 112, a Home Subscriber Server (HSS) 114, and an anomaly detection application 130. 3GPP RAN 120 may include at least one eNodeB 122. Also shown in FIG. 1 are an 'N' number of user equipment (UE) 102(1)-102(N) and a Packet Data Network (PDN) 116. In at least one embodiment, MME 104, SGW 106, PGW 108, PCRF 110, AAA server 112, and HSS 114 may provide mobile packet core 140 for mobile network 100. In at least one embodiment, mobile network 100 may include a non-3GPP access network 126, which may include at least one WLAN access point 128. As referred to herein, SGW 106 and PGW 108 may be referred to as 'data-path' network elements that may handle (e.g., process, forward, etc.) data packet flows or traffic associated with UE 102(1)-102(N) sessions.

In various embodiments, PDN 116 may be associated with any Access Point Name (APN) or Data Network Name (DNN) (for 5G implementations), such as the Internet, an IMS, or the like. Other network elements may be included in mobile packet core 140, as may be prescribed by 3GPP standards. In at least one embodiment, 3GPP RAN 120 may include eNodeB 122 that enables over-the-air Radio Frequency (RF) communications with UEs 102(1)-102(N).

In at least one embodiment, anomaly detection application 130 may be implemented/hosted/instantiated via a compute node 150 within mobile network 100. Anomaly detection application 130 may interface with at least one database 132 provided via compute node 150. In some embodiments, compute node 150 may be configured as a network management element, which may include, but not be limited to, an SDN controller, a Network Processor Unit (NPU) manager, a Cisco® Digital Network Architecture Center (DNAC), or the like.

For the embodiment of FIG. 1, eNodeB 122 may interface with MME 104 and SGW 106. MME 104 may further interface with SGW 106, PCRF 110, and HSS 114. SGW 106 may further interface with PCRF 110 and PGW 108. PCRF 110 may further interface with PGW 108. PGW 108 may further interface with PDN 116 and AAA server 112. HSS 114 may further interface with AAA server 112. AAA server 112 may further interface WLAN access point 128, typically via one or more evolved packed data gateways (ePDGs) (not shown). Interfaces among various elements of mobile network 100 may be implemented in accordance with 3GPP standards.

In at least one embodiment, anomaly detection application 130 may interface with MME 104, SGW 106, PGW 108, PCRF 110, AAA server 112, and HSS 114. In at least one embodiment, interface interconnections between anomaly detection application 130 and each of MME 104, SGW 106, PGW 108, PCRF 110, AAA server 112, and HSS may be provided via corresponding Representational State Transfer (REST) Application Programming Interfaces (APIs) 134 that facilitate interfacing (e.g., communicating messages, facilitating API procedure calls, etc.) between corresponding network elements and anomaly detection application 130. Other APIs and/or interfaces can be used to facilitate communications/interactions between anomaly detection application 130 and network elements, in various embodiments.

In at least one embodiment, each of MME 104, SGW 106, PGW 108, PCRF 110, AAA server 112, and HSS 114 may include REST API logic to facilitate communications with anomaly detection application 130 and/or to trigger one or more operations at one or more of the network elements (e.g., activation/deactivation of tracing and packet capturing, changing the level or intensity of tracing, capturing historical information for UE sessions to send to anomaly detection application 130, etc.) for various embodiments described herein.

Although anomaly detection application 130 is illustrated external to SGW 106, PGW 108, and PCRF 110 for the embodiment of FIG. 1, in some embodiments, each of SGW 106 and PGW 108 may be configured with an anomaly detection application in lieu of and/or in addition to anomaly detection application 130 being provided external to these elements in order to perform various anomaly detection operations locally at SGW 106 and PGW 108, as discussed herein. Thus, different variations may be possible for implementing various anomaly detection applications/logic within mobile network 100. In some embodiments, different levels of anomaly detection may be implemented via mobile network 100. For example local detection at SGW 106 and PGW 108 for certain types of anomalies and global detection at anomaly detection application 130 for the same or different types of anomalies may be provided within mobile network 100.

Among other things as discussed for various embodiments described herein, MME 104 can provide tracking area list management, idle mode UE tracking, bearer activation and deactivation, SGW and PGW selection for UE 102(1)-102(N) sessions, authentication services, etc. Among other things as discussed for various embodiments described herein, SGW 106 can route and forward user data packets, while also acting as a mobility anchor for the user plane during inter-cell handovers and as an anchor for mobility between LTE and other 3GPP technologies. Among other things as discussed for various embodiments described herein, PGW 108 may provide IP connectivity access network (IP-CAN) session connectivity for UEs 102(1)-102(N) to PDN 116. PGW 108 may also serve as a policy and charging enforcement point to manage Quality of Service (QoS), online and/or offline flow-based charging, data generation, deep-packet inspection, intercept, etc. Among other things as discussed for various embodiments described herein, PCRF 110 can support the creation/installation/etc. of policy and charging control (PCC) rules and make policy and/or charging decisions for each of a respective subscriber associated with each respective UE 102(1)-102(N) session for various elements (e.g., PGW 108, etc.) of mobile packet core 140.

Among other things as discussed for various embodiments described herein, AAA server 112 may provide authentication, authorization, and accounting services for UE 102(1)-102(N). AAA servers are typically used for providing AAA services between non-3GPP access network 126 such as WLANs (e.g., Wi-Fi, etc.), enterprise networks, or the like and a mobile packet core (e.g., mobile packet core 140) to enable UEs 102(1)-102(N) within mobile network 100 to connect to mobile packet core 140 via non-3GPP access network 126. For AAA considerations, for example, AAA server 112 may provide accounting session identification and other UE AAA states. Authentication refers to the process where an entity's identity is authenticated, typically by providing evidence that it holds a specific digital identity such as an identifier and the corresponding credentials. Authorization refers to the process of determining whether a particular entity is authorized to perform a given activity, typically inherited from authentication when logging-on to an application or service. Authorization may be determined based on a range of restrictions, for example, time-of-day restrictions, physical location restrictions, restrictions against multiple accesses by the same entity or user, etc. Accounting refers to the process of tracking of network resource consumption by users for the purpose of capacity and trend analysis, cost allocation, billing, etc. Among other things as discussed for various embodiments described herein, HSS 114 may include one or more databases containing user-related and subscription-related information. HSS 114 may perform functionalities such as mobility management, call and session establishment support, user authentication and access authorization for 3GPP access to mobile packet core 140 via 3GPP RAN 120.

In various embodiments, UEs 102(1)-102(N) may be associated with any user, subscriber, employee, client, customer, electronic device, etc. wishing to initiate a flow (e.g., a data packet flow) in mobile network 100. The terms 'UE device', 'UE', 'subscriber', 'UE/subscriber', and 'user' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within mobile network 100. UEs 102(1)-102(N) discussed herein may also be inclusive of a suitable interface to a human user such as a microphone, a display, a keyboard, or other terminal equipment. UEs 102(1)-102(N) may also be any device that seeks to initiate a communication on behalf of another entity or element such as a program, a database, or any other component, device, element, or object capable of initiating an exchange within mobile network 100. In some embodiments, UEs 102(1)-102(N) may have a bundled subscription for network access and application services, etc.

Techniques implemented via mobile network 100 provide a framework in which per-subscriber proactive and intelligent tracing and packet capturing may be triggered automatically without manual intervention from a network operator, technician, experts, support teams, or the like. For example, techniques implemented via mobile network 100 may provide for the ability to monitor and detect UE/subscriber events using various parameters such as location, Radio Access Technology (RAT) type information, among others as discussed for various embodiments herein, and other attributes (e.g., event sequence and/or state) in order to correlate and identify an anomaly associated with a UE session/data packet flow for activating tracing and packet capturing utilizing the UE/client history (e.g., historical information) maintained within database 132 by anomaly detection application 130 for UE 102(1)-102(N) sessions. Tracing and packet capturing may be referred to herein collectively using the term 'tracing/packet capturing' and variations thereof for some discussions/examples/etc. Further as referred to herein, the terms 'identifying', 'detecting', and variations thereof in reference to determining an anomaly for a UE session may be used interchangeably.

In some embodiments, such as when data-path network elements SGW 106 and PGW 108 may be configured with an anomaly detection application, SGW 106 and PGW 108 may also store/maintain historical information for UE 102(1)-102(N) in order to identify one or more UE sessions/data packet flow of interests (e.g., to predictively determine whether one or more UE sessions may experience an anomaly in the future) to proactively trigger activation of tracing and packet capturing for one or more data packet flows of one or more UE sessions.

During operation in at least one embodiment, REST APIs 134 may facilitate communications between various network elements of mobile packet core 140 and anomaly detection application 130 using various messaging/notifications/API procedure calls/etc. to capture (e.g., gather, collect, receive, etc.) historical information for UE 102(1)-102(N) sessions, to trigger tracing and packet capturing for one or more UE 102(1)-102(N) sessions along the data-path for data packet flows of the UE sessions, to deactivate tracing for one or more UE 102(1)-102(N) sessions, to changing a level or intensity of tracing for one or more UE 102(1)-102(N) sessions, combinations thereof, and/or the like as discussed herein.

Data-path network elements SGW 106 and PGW 108 may include trace logic configured to facilitate tracing and packet capturing operations as discussed herein. In general, tracing and packet capturing operations may include capturing (e.g., copying) various types of packet information associated with a packet into one or more trace buffers of a network element or node. Typically, when a packet is captured, information for the packet (depending on the tracing level or intensity that is activated) is copied into a trace buffer associated with the packet, which can then be analyzed to debug potential network/UE issues. Tracing can be performed for any combination of control plane and/or data plane packets associated with a UE session.

In various embodiments, different levels or intensities of tracing that may be activated may include full packet capturing (e.g., full trace) in which all contents of the packet (e.g., packet header and packet payload) are captured and stored in a trace buffer associated with the packet, partial packet capturing (e.g., medium trace, light trace, etc.) in which any combination of packet information less than full packet capturing may be stored in a trace buffer associated with the packet, capturing all data packets of a data packet flow, capture exceedingly short bursts of data packets before stopping tracing, and/or combinations/variations thereof. In various embodiments, different levels or intensities for tracing may be set to indicate capturing various packet processing information (e.g., packet counts, metadata, etc.). Any number of different levels/intensities for tracing may be implemented in accordance with embodiments described herein.

Packet and/or processing information contained in trace buffers for a trace of a data packet flow of a particular UE session may be assembled via one or more operations into a detail or trace log, which may be analyzed by a network operator, technician, experts, support teams, etc. and/or one or more computer-implemented processes/processing, etc. to debug one or more problems that may be occurring within mobile network 100 and/or with UE 102(1)-102(N) sessions. Any packet and/or processing information that may be captured for traces of one or more data packet flows of one or more UE 102(1)-102(N) sessions may be collectively referred to herein as 'debug information'.

In at least one embodiment, upon detection of one or more anomalies for one or more UE 102(1)-102(N) sessions, anomaly detection application 130 may report/feed one or both of SGW 106 and/or PGW 108 with a list of UEs/subscribers that are experiencing an anomaly in order to automatically activate tracing and packet capturing for these network elements or nodes for one or more data packet flows of one or more UE 102(1)-102(N) sessions.

In various embodiments, the list of UEs/subscribers provided by anomaly detection application 130 (e.g., via a corresponding REST API 134) for which tracing and packet capture is to be activated by SGW 106/PGW 108 may provide any level of UE identification (e.g., International Mobile Subscriber Identity (IMSI)), UE session identification (e.g., for different session types such as IP, IMS, etc.), packet flow identification (e.g., using 5-tuple information such as destination address/port, source address/port, and protocol and/or any other N-tuple information), application identification (e.g., gaming, video streaming, social media, etc.), Uniform Resource Locator (URL) identification (e.g., for UE communications with certain websites), combinations thereof, or the like to facilitate tracing and packet capturing for any granularity of data packet flows for one or more UE 102(1)-102(N) sessions. Thus, any levels/intensities for tracing and packet capturing for any granularity of data packet flows for one or more UE 102(1)-102(N) sessions may be facilitated by techniques implemented via mobile network 100, as discussed for various embodiments herein.

In some embodiments, SGW 106 may include decision tree logic 107 and/or PGW 108 may include decision tree logic 109, to trigger, autonomously and/or in combination with anomaly detection application 130, one or more operations including, but not limited to, activation of intelligent tracing and packing capturing for one or more UE 102(1)-102(N) sessions. For example, in some embodiments, the data-path network elements SGW 106/PGW 108 may be made intelligent via decision tree logic 107/109 to implement decision tree based analytics for automatically enabling tracing and packet capturing based on one or more decision points of one or more decision trees configured for the nodes in addition to and/or in combination with utilizing network assisted anomaly detection that may be provided via anomaly detection application 130. In still some embodiments, outputs or "results" from one or more nodes of decision trees can be communicated to anomaly detection application(s) (e.g., applications operating internally within SGW 106/PGW 108 and/or externally, such as anomaly detection application 130) to improve detection of anomalies by such application(s).

The process of data-path network elements triggering trace activation and packet capturing using decision tree logic (e.g., decision tree logic 107/109) may be referred to herein as 'intelligent tracing and packet capturing'. The process of triggering trace activation and packet capturing using anomaly detection, whether via anomaly detection application 130 and/or an anomaly detection application configured for one or more data-path network elements SGW 106 and/or PGW 108, may be referred to herein as 'proactive tracing and packet capturing'. In some embodiments, tracing and packet capturing can be both intelligent and proactive depending on different triggers, which may occur autonomously via decision tree logic, based on anomaly detection via one or more anomaly detection application(s), and/or any combination thereof.

Thus, without manual intervention, solutions and techniques described for various embodiments herein may facilitate automatically activating tracing and packet capturing via anomaly detection application 130 and/or intelligent packet capturing and tracing triggered via one or more network elements for one or more data packet flows of one or more UE 102(1)-102(N) sessions within mobile network 100.

In general, techniques implemented via mobile network 100 may be characterized via three building blocks or stages:

1) Capturing of historic information from UE/subscriber sessions and anomaly detection via anomaly detection application 130 (and/or logic for one or more data-path network elements, possibly including submissions from the decision tree logic 107/109) to trigger proactive tracing and packet capturing;

2) Communicating a trigger of subscriber tracing from one data-path network node to one or more other data-path network nodes (e.g., SGW 106/PGW 108); and 3) Data-path network elements or nodes (e.g., SGW 106/PGW 108) utilizing information to trigger intelligent tracing and packet capturing.

In various embodiments, operations associated with anomaly detection and capturing historic information from UE 102(1)-102(N) sessions may include determining that a UE/subscriber session is misbehaving and should be traced based on analysis of one or more parameters and/or other attributes captured for the UE/subscriber session and/or that have been crowd sourced from historical information captured/maintained for other UE/subscriber sessions within mobile network 100.

In at least one embodiment, SGW 106 and PGW 108 may provide the data-path to facilitate the exchange of data packets of data packet flow 103(1) between UE 102(1) and PDN 116. For example embodiments discussed herein, consider a data packet flow 103(1) associated with a session for UE 102(1) in which data packets are communicated between UE 102(1) and PDN 116. A GTP-U encapsulated data packet 113 associated with data packet flow 103(1) for the UE 102(1) session is also illustrated in FIG. 1 in which the GTP-U encapsulated data packet 113 is destined for UE 102(1) and is forwarded from PGW 108 to SGW 106.

In at least one embodiment, historical information may include parameters captured via messages received from UE/subscriber sessions such as, but not limited to, device type identification and RAT type (e.g., access type) information. For example, if UE 102(1) has connected to mobile packet core 140 using the RAT type Narrowband-IoT (NB-IoT) and switches its connection using Evolved Universal Mobile Telecommunication System (UMTS) Terrestrial RAN (E-UTRAN) (e.g., 4G/LTE) then, based on this switching, anomaly detection application 130 may determine an anomaly has occurred for the UE 102(1) session and may send a notification to SGW 106 and/or PGW 108 triggering trace activation packet capturing by the node(s).

For example, the RAT type as determined by MME 104 on which a particular UE 102(1)-102(N) is camping on may be used along with crowd sourced data, typically maintained at a location database (DB) by MME 104 in which historical RAT type may be stored along with user location information and/or other attributes such as call failure statistics/reasons for the particular UE to determine an anomaly has occurred/is occurring for the particular UE via anomaly detection application 130. In some embodiments, per-subscriber trace activation may be triggered for control plane network elements such as MME 104 and/or HSS 114.

More generally, if an IoT device or UE behaves vice-versa connecting to NB-IoT and subsequently to E-UTRAN, this may be indicative of an anomaly that may be detected by anomaly detection application 130, to trigger trace activation and packet capture for further analysis. In at least one embodiment, device type identification may be facilitated by capturing any combination of the International Mobile Station Equipment Identity (IMEI), IMEI Software Version (IMEISV), and/or IMSI of a particular UE/subscriber 102(1)-102(N).

In some embodiments, captured parameters may also include user location information. For example, UE/subscriber location can be used to detect an anomaly in order to initiate packet tracing for the UE/subscriber. Service providers typically use location based systems to determine UE/network operations. For example, UE 102(1)-102(N) location information may be provided via a 3GPP User Location Information (ULI) Information Element (IE) via UE Tracking Area Update (TAU) messaging, which may trigger handover operations, network element selection operations, etc. as UEs 102(1)-102(N) move throughout access networks of mobile network 100. In various embodiments, location information may include, but not be limited to, any combination of: Tracking Area Identifier (TAI), Routing Area Identifier (RAI), Cell Global Identification (CGI), E-UTRAN CGI (ECGI), Service Area Identifier (SAI), Global Positioning System (GPS) coordinates, and/or any other location information that may be utilized within 3GPP architectures (e.g., via ULI). In at least one embodiment, mobile network 100 may leverage existing location databases utilized in 3GPP architectures (e.g., via MME 104, etc.) to capture and store location information for UE 102(1)-102(N).

In at least one embodiment, database 132 may be enhanced to provide a new location database in which location history for UEs 102(1)-102(N) can be maintained and used for detecting anomalies associated with UE 102(1)-102(N) sessions. For example, if the location of UE 102(1) is in different country or other abnormal location than what is historically stored for the UE's location, an anomaly may be determined and packet tracing for data packet flow 103(1) of the UE 102(1) session can be enabled.

In another example, PGW 108 typically communicates the location of a UE/subscriber to PCRF 110 over Gx (i.e., the 3GPP interface interconnecting PGW 108 and PCRF 110). In at least one embodiment, PCRF 110 may provide such location information to anomaly detection application 130 via its REST API 134. Anomaly detection application 130 can store the information in database 132 to utilize for anomaly detection operations.

Additionally, in some embodiments, location information can be used to determine if a particular UE/subscriber may encounter an issue/anomaly in a particular location based on crowd sourced UE location and connectivity issue/anomaly information for the particular location. For example, if UE 102(1) comes or enters into the into the same eNodeB cell area as other UEs experiencing issues/anomalies in that eNodeB cell area, tracing and packet capture for data packet flow 103(1) may be proactively triggered via anomaly detection application 130 for the UE 102(1) session.

In at least one embodiment, historical information that may be captured for UE 102(1)-102(N) sessions may also include one or more attributes such as event sequence and/or event state. In various embodiments, the following events may be used for identifying potential Subscriber/UE issues/anomalies:

1) Frequent rejection of a UE/Subscriber by AAA server 112 and/or HSS 114 during session/call establishment.

2) Frequent rejection of a UE/Subscriber by network nodes such as SGW 106 and/or PGW 108 during session/call establishment.

For example, per-UE/subscriber historical information (e.g., error data) may be maintained in database 132, which may, in some embodiments be combined with a location DB, and, based on historic frequent failures, a particular UE/subscriber may be marked via anomaly detection application 130 for proactive tracing and packet capture such that subsequent attempts for session/call establishment by the UE will be traced. The tracing can be performed for a preconfigured or defined time period.

Timing information such as time-stamps may also be stored in database 132 in association with UE/subscriber events and/or states in some embodiments, which may be used to determine whether a UE is experiencing an anomaly. For example, in some embodiments, event state information may be analyzed via anomaly detection application 130 in relation to further session/call establishment attempts by UEs 102(1)-102(N) for a pre-configured or defined period of time in which, if a threshold number of attempts is exceeded, a particular UE/subscriber may be marked for initiating tracing and packet capture for subsequent attempts for another defined period of time.

In still some embodiments, on successful session/call establishment and/or after a pre-configured or defined period of time, anomaly detection application 130 can refresh database 132 to remove historical information for one or more UEs 102(1)-102(N) in order to avoid having database 132 grow unconditionally.

Accordingly, during operation in at least one embodiment, captured parameters and/or attributes such as IMSI, ULI, RAT Type information, time-stamp information, call termination reason and/or any other parameters, event sequence/state information may be communicated from any network element (e.g., MME 104, SGW 106, PGW 108, PCRF 110, AAA server 112, HSS 114, etc.) within mobile network 100 to anomaly detection application 130 via REST APIs 134 and stored in database 132 for every session establishment or termination for UE 102(1)-102(N).

The captured parameters, attributes, etc. may provide the historical information that can be used by anomaly detection application to detect one or more anomalies are for one or more UE 102(1)-102(N) sessions based on matching/comparing historical information for the same UE and/or one or more other UEs, using various operations/methods/techniques discussed above, including but not limited to: performing location comparisons (e.g., comparing a current location of a UE versus historic location of the UE, determining that the UE is entering or is about to enter an area in which other UE are experiencing anomalies, etc.), performing threshold comparisons (e.g., determining frequent rejections, frequent call terminations, etc. for a period of time for a UE and/or in comparison to other UEs), performing RAT type comparisons (e.g., determining frequent RAT type switches for a period of time for a UE and/or in comparison to other UEs), performing device type comparisons (e.g., determining that certain device types are experiencing anomalies), performing flow/application/session comparisons (e.g., determining anomalies with certain flows/applications/sessions, etc.), combinations thereof, and/or any other operations that may be utilized for detecting anomalies with one or more UE 102(1)-102(N) sessions.

The example operations/methods/techniques for detecting anomalies for one or more UE sessions discussed herein are only a few of the many operations/methods/techniques that may be used to detect anomalies for one or more UE sessions and are not meant to limit the broad scope of the present disclosure. Virtually any other operations/methods/techniques may be used to detect anomalies for one or more UE sessions and, thus, are clearly within the scope of the present disclosure.

Upon detecting an anomaly for one or more UE 102(1)-102(N) sessions and/or identifying one or more UE 102(1)-102(N) sessions of interest, anomaly detection application 130 marks the UE/subscriber for tracing and packet capture and notifies SGW 106 and/or PGW 108 to trigger trace activation at SGW 106 and/or PGW 108. The notifications to SGW 106 and/or PGW 108 can be provided in parallel or in any order as may be determined by anomaly detection application 130. In some embodiments, anomaly detection application 130 may notify the data-path network element(s), SGW 106 and/or PGW 108, via corresponding REST APIs 134, of the list of UEs for which to activate tracing and packet capturing for one or more data packet flows of one or more UE 102(1)-102(N) sessions upon detection of an anomaly and/or identifying sessions of interest; however, in other embodiments, anomaly detection application 130 may periodically notify the data-path network elements of the list of UEs for which to activate tracing and packet capturing.

Upon receiving a notification via a corresponding REST API to activate tracing and packet capture for one or more one or more data packet flows of one or more UE 102(1)-102(N) sessions, control/management logic for SGW 106 and/or PGW 108 may mark/identify (e.g., in its local memory element(s)), for one or more data packet flows of the UE/subscribers contained in the list, to be traced automatically on a next activity control and/or data activity (e.g., data packet processing, control plane message processing, etc.) using per-subscriber tracing and packet capture operations provided via trace logic configured for each network element. In some embodiments, a level or intensity of tracing may also be included in the notification from anomaly detection application 130. As discussed in further detail herein below, data-path intelligent tracing and packet capturing operations may also be performed by PGW 108 and/or SGW 106 based on decision tree analysis that may be performed by each network element, in some embodiments.

In some embodiments, anomaly detection application 130 may also notify SGW 106 and/or PGW 108 to deactivate tracing and packet capture of one or more data packet flows for one or more UE 102(1)-102(N) sessions as well as activating tracing. In still some embodiments, anomaly detection application 130 may include in an initial trace activation notification, a preconfigured or defined time period or duration for which tracing is to be activated for one or more data packet flows of one or more UE 102(1)-102(N) sessions. In still some embodiments, anomaly detection application may also notify SGW 106 and/or PGW 108 to change a level or intensity of tracing.

Thus, anomaly detection application 130 may provide for the ability to proactively activate, deactivate and/or change tracing and packet capture for one or more UE sessions 102(1)-102(N) within mobile packet core 140. Activating, deactivating, and/or changing tracing and packet capturing may be referred herein more generally as tracing related actions.

Figure 2:
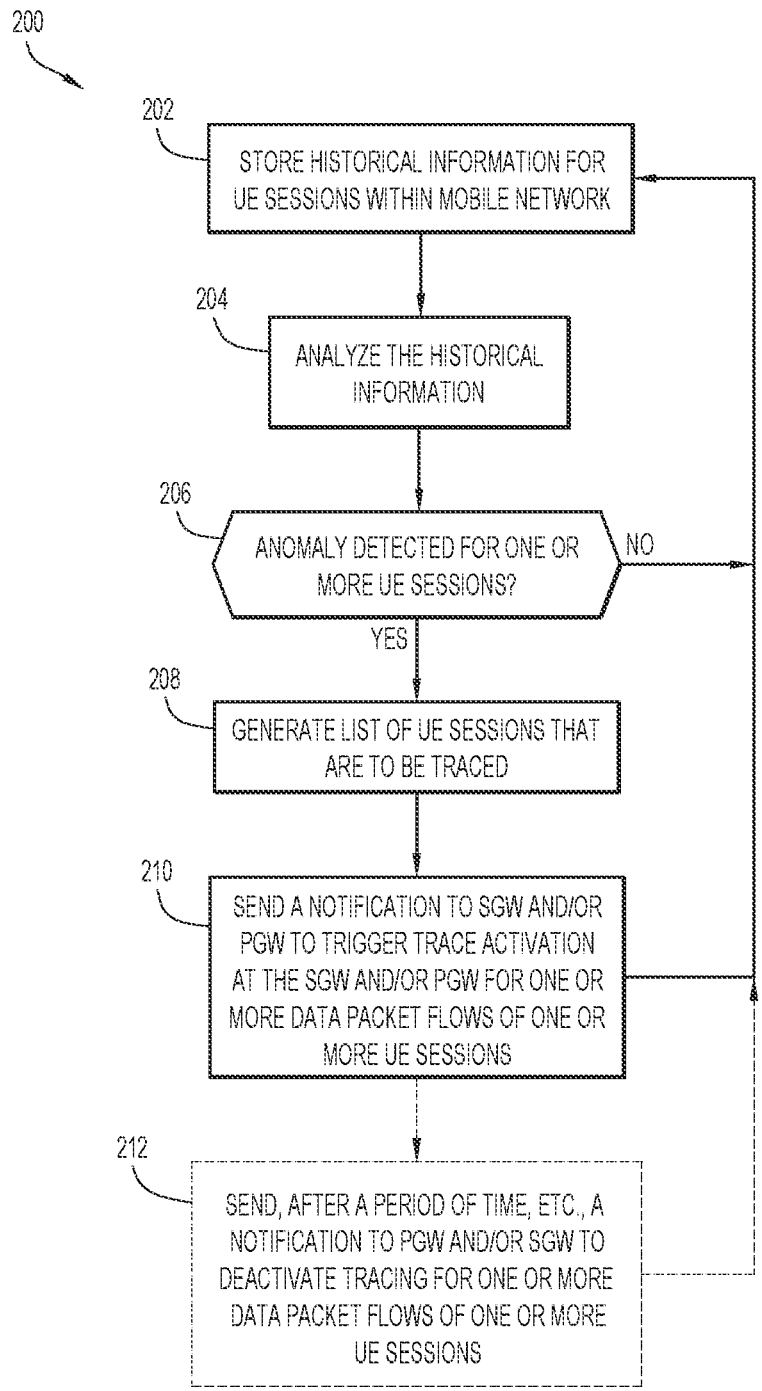
FIG. 2 is a simplified flow chart illustrating example operations associated with anomaly detection and proactive trace activation and packet capturing that may be performed by an anomaly detection application, according to an example embodiment.

Referring to FIG. 2, FIG. 2 is a simplified flow chart illustrating example operations 200 associated with anomaly detection and proactive trace activation and packet capturing that may be performed by anomaly detection application 130, according to an example embodiment.

In at least one embodiment, operations 200 may include, at 202, anomaly detection application 130 storing historical information based on parameters and/or attributes captured for one or more UE sessions (e.g., UE 102(1)-102(N)) by one or more network elements (e.g., any of MME 104, SGW 106, PGW 108, PCRF 110, etc.) of mobile packet core 140. The historical information may be stored within database 132. As discussed herein, UE session parameters and/or attributes can be captured via one or more network elements or nodes within mobile packet core 140 and sent to anomaly detection application 130 via corresponding REST APIs 134 providing an interface between the network elements and anomaly detection application 130. The network elements or nodes may be configured with REST API logic and/or other processing logic, hardware, etc. to facilitate capturing various parameters and/or attributes for one or more UE 102(1)-102(N) sessions.

Operations 200 may further include, at 204, anomaly detection application 130 analyzing the historical information stored within database 132 to detect whether one or more anomalies have occurred for one or more UE 102(1)-102(N) sessions. The operations 200 may further include, at 206, anomaly detection application 130 determining whether any anomalies are detected for one or more of UE 102(1)-102(N) sessions. Based on a determination at 206 that no anomalies are identified for one or more of UE 102(1)-102(N) sessions, the operations return to 202 in which historical information continues to be stored and analyzed for the UE 102(1)-102(N) sessions via anomaly detection application 130.

However, based on a determination at 206 that one or more anomalies are detected for one or more UE 102(1)-102(N) sessions, the operations may continue to 208 at which anomaly detection application generates a list of one or more UEs for which tracing and packet capturing is to be activated at SGW 106 and/or PGW 108. In at least one embodiment, the list may include one IMSI per each UE for which tracing is to be activated. In some embodiments, a level or intensity of tracing may also be identified for each UE of the list. At 210, the operations include anomaly detection application 130 sending a notification to SGW 106 and/or PGW 108 including the list of UEs to trigger trace activation and packet capturing for one or more packet flows for the UE sessions for which one or more anomalies have been identified. Following 210, the operations may return to 202 in which historical information continues to be stored and analyzed. As discussed herein, the notification at 210 may be sent to SGW 106 and/or PGW 108 periodically or upon identification of one or more anomalies for one or more UE sessions. In some embodiments, the notification sent to SGW 106 and/or PGW 108 at 210 may also include a level or intensity of tracing to activate for the one or more UE sessions.

In some embodiments, as shown at 212, anomaly detection application 130 may send, after a period of time, after no further anomalies are identified for a UE session, after one or more events and/or event sequences, etc., a notification to SGW 106 and/or PGW 108 to deactivate tracing for one or more UE sessions at the node(s). Following 212, the operations may return to 202 in which historical information continues to be stored and analyzed.

Referring again to FIG. 1, PGW 108, upon activation of tracing for a UE session, can, in some embodiments, communicate to SGW 106 that tracing and packet capture is to be activated for the UE session by including a trace activation indication within a user plane General Packet Radio Service (GPRS) Tunneling Protocol (GTP-U) extension header of data plane messages forwarded to SGW 106. Such a communication could also be made from SGW 106 to PGW 108 in some embodiments. In another example, if intelligent tracing and packet capturing is activated, deactivated, and/or a level or intensity of tracing is changed by a data-path network element such as SGW 106 or PGW 108, then the data-path network element can communicate the tracing/packet capturing action can be communicated to a neighboring data-path network element via a GTP-U extension header included within a GTP-U encapsulated data packet communicated from one data-path network element to another data-path network element.

Use of a GTP-U extension header, as discussed for embodiments herein, may be used to activate, deactivate, and/or change tracing for a UE session. Various example details associated with the trace activation indication that may be provided for a GTP-U extension header, are discussed in further detail below with reference to FIG. 3.

Figure 3A:
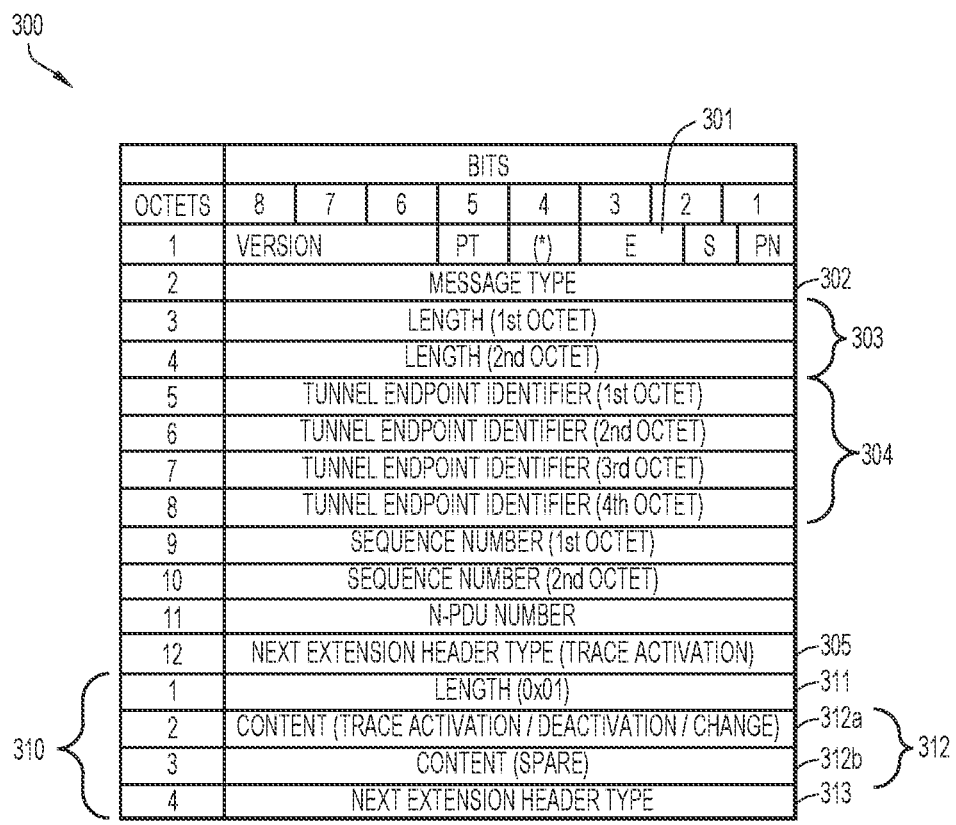
FIG. 3A is a simplified diagram illustrating example details associated with a user plane General Packet Radio Service (GPRS) Tunneling Protocol (GTP-U) header including a GTP-U extension header that may be used to trigger activation, deactivation, or a change of tracing and packet capturing at another network element, according to an example embodiment.
Figure 3B:
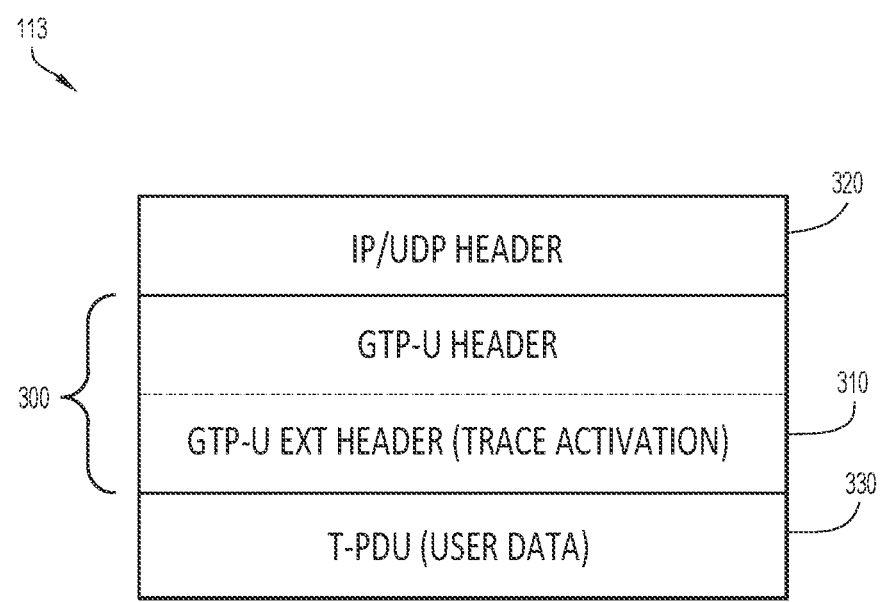
FIG. 3B is a simplified diagram illustrating example details associated with a data packet including the GTP-U extension header of FIG. 3A, according to an example embodiment.

Referring to FIG. 3A, FIG. 3A is a simplified diagram illustrating example details associated with a GTP-U header 300 including a GTP-U extension header 310 that may be used to trigger activation, deactivation, or a change of tracing and packet capturing at another network element, according to an example embodiment. Referring to FIG. 3B, FIG. 3B is a simplified diagram illustrating example details associated with GTP-U encapsulated data packet 113, which includes GTP-U header 300 including GTP-U extension header 310. For example, in at least one embodiment upon activating tracing and packet capturing based on a notification received from anomaly detection application 130 and/or upon determining an intelligent tracing/packet capturing related action, PGW 108 may include within GTP-U encapsulated data packet 113 a GTP-U header 300 that includes GTP-U extension header 310, as shown in FIG. 3A, and forward data packet 113 to SGW 106 in order to trigger activation, deactivation, or a change of tracing and packet capturing at SGW 106. Similar operations may be performed for communicating notifications from SGW 106 toward PGW 108. Techniques implemented via mobile network 100 may include defining a new GTP-U extension header type, referred to herein as a 'Trace Activation' header type set to a binary value '1100 0011' to indicate the Trace Activation GTP-U extension header type.

GTP-U encapsulation is generally defined in 3GPP Technical Specification (TS) 29.281. In at least one embodiment, GTP-U header 300 may include various fields including, but not limited to: an Extension Header Flag (E) field 301, a Message Type field 302, Length fields 303, Tunnel Endpoint Identifier (TEID) fields 304, and a Next Extension Header Type field 305. Extension Header Flag field 301 may be set '1' to indicate the presence of an extension header (e.g., GTP-U extension header 310). Message Type field 302 may be set to message type, Length fields 303 may be set to a length of a payload of encapsulated user data, typically referred to as a Transport-PDU (T-PDU), and TED fields 304 may be set as defined by 3GPP TS 29.281. For example, TED fields 304 may be set to values that identify SGW 106 as the tunnel endpoint for GTP-U encapsulated data packet 113 for a GTP-U tunnel between SGW 106 and PGW 108 established for the UE 102(1) session. Similarly, TEID fields 304 can be set to values that identify PGW 108 for data packets sent from SGW 106 to PGW 108.

Next Extension Header Type field 305 may be set to binary '1100 0011' to indicate that GTP-U extension header 310 is of the type 'Trace Activation', which can be used to indicate that packet tracing and capturing is to be activated (or deactivated or changed) for the UE (e.g., UE 102(1)). It is to be understood that the binary value '1100 0011' is provided for example only and any other non-reserved binary value may be used to indicate the 'Trace Activation' header type in accordance with embodiments described herein.

As referred to herein, a GTP-U extension header of a type 'Trace Activation', may be referred to as a 'Trace Activation GTP-U extension header' (e.g., Trace Activation GTP-U extension header 310).

Trace Activation GTP-U extension header 310 may include various fields including: a Length field 311, a number of Content fields 312, and a Next Extension Header Type field 313. In at least one embodiment, Length field 311 for the first octet of GTP-U extension header 310 may be set to hexadecimal '0x01' (binary '0000 0001') to indicate the length of GTP-U extension header 310 is 4-bytes, a first Content field 312a may be set to binary '0000 0001', which may indicate trace activation for the data packet flow 103(1) for the UE 102(1) session, a second Content field 312b may not be set (e.g., binary '0000 0000'), and Next Extension Header type field 313 may or may not be set (depending on whether or not another GTP-U extension header follows Trace Activation GTP-U extension header 310).

In some embodiments, first Content field 312a may not be set or may be set to zero (e.g. binary '0000 0000'), which may be used to indicate deactivation of tracing for a UE session. In still some embodiments, any number and/or combination of other bits of first content field 312a and/or second content field 312b may be set to indicate, not only trace activation/deactivation for a data packet flow of a UE session, but also a level or intensity or a change of level or intensity of tracing (e.g., full, partial, different levels of partial, capturing different types of information, capturing all data packets, capturing bursts of data packets, etc.), and/or any other trace information that may be utilized for one or more trace actions for a UE session.

As illustrated in FIG. 3B, GTP-U encapsulated data packet 113 forwarded from PGW 108 to SGW 106 may, in at least one embodiment, include an IP/User Datagram Protocol (UDP) header 320 [containing source/destination IP addresses and source/destination ports, as per 3GPP TS 29.281], GTP-U header 300 including GTP-U extension header 310 of the type 'Trace Activation' including, at least in part, the indication to activate tracing (e.g., binary '0000 0001') for data packet flow 103(1) for the UE 102(1) session, and a T-PDU 330 containing user data for the UE 102(1) session. Although the indication illustrated in FIG. 3B is for activating a trace, it is to be understood that any indication may be included in accordance with embodiments described herein.

In normal operation, GTP-U-encapsulated mobile subscriber packets (user traffic) are processed by data plane logic/software of a network element (e.g., SGW 106/PGW 108), having been classified by appropriate logic to identify the subscriber based upon the IP addresses and GTP-U TEID fields, among others. The method of classifying subscriber traffic is implementation-specific and, thus, may vary depending on implementation.

For example, in Cisco® ASR5500 and Virtual Packet Core (VPC) products, Network Processor Units (NPU) and/or other software-based equivalents are configured to perform shallow packet inspection (SPI) on the header stack in order to determine the UE/subscriber or control logic/software that is to process the received traffic. Proper classification to a subscriber level may use tables/databases configured in the data plane, consisting of a collection of hash tables, longest prefix match (LPM) tables, and Access Control Lists (ACLs). In Cisco® ASR5500 and VPC products, recognition of a subscriber for the purposes of tracing is configured directly into the subscriber classification tables (e.g., hashes, LPMs, and ACLs), which have special 'trace-enable' flags. Lookup in the tables produces a result which offers guidance for processing, including the (internal) destination for the subscriber traffic in which the subscriber traffic is directed towards an entity known as Session Manager (SMGR) or, more generally, subscriber management logic, which has subscriber-level awareness, and is therefore responsible for all subscriber configuration and processing.

Thus, in addition to configuring the data plane to recognize these GTP-U packet flows for normal subscriber traffic, the management planes (e.g., control/management logic) of respective PGW 108 and SGW 106 can configure their respective data planes to divert GTP-U encapsulated trace activation, deactivation, or change requests to the subscriber management logic. Upon receiving trace activation (or deactivation or change) requests (e.g., by SGW 106 from PGW 108 or by PGW 108 from SGW 106), the subscriber management logic makes requests to the data plane management logic/software to activate/deactivate/change tracing of appropriate data packet flows via trace logic. For example, in Cisco® Vector Packet Processing (VPP)-based ASR5500 and VPC products, the data plane is managed by an NPU Manager, which has numerous management APIs, including those to manage and control data plane tracing.

Thus, upon receiving the trace-related request by SGW 106 via GTP-U extension header 310, in this example, the data plane management logic/software for SGW 106 facilitates configuration of the data plane trace logic to recognize the subscriber data packet flow 103(1) (by IP address, GTP-U TEIDs, and/or any other appropriate mechanisms) and initiate tracing (or deactivate tracing, as the case may be) for the data packet flow 103(1). Similar operations could be performed by PGW 108 based on a trace-related request received from SGW 106.

Once the data plane trace logic has been configured to recognize the subscriber traffic flows and begin tracing, packets and/or behaviors of the packet processing may be captured in the local tracing buffers by SGW 106 (or PGW 108, if applicable). Thereafter, the trace of data packet flow 103(1) for the UE 102(1) session may be assembled via one or more operations into a detail or trace log, for consumption (e.g., analysis) by a network operator, technician, experts, support teams, etc. and/or one or more computer-implemented processes/processing, etc. to debug one or more problems that may be occurring within mobile network 100 and/or with UE 102(1).

Thus, in some embodiments, trace activation/deactivation indications between data-path network elements can be provided 'in-band' via GTP-U extension header 310 included within a GTP-U header of GTP-U encapsulated data packets. In other embodiments, however, trace activation/deactivation indications between data-path network elements may be provided 'out-of-band' using GTP-U extension header 310 within non-UE session-based GTP-U encapsulated data packets (e.g., generic data packets), using control plane GTP (GTP-C) signaling/messages, which may or may not utilize a GTP-C extension header that can be configured similar to GTP-U extension header), and/or using any other out-of-band signaling mechanisms between data-path network elements.

Figure 4:
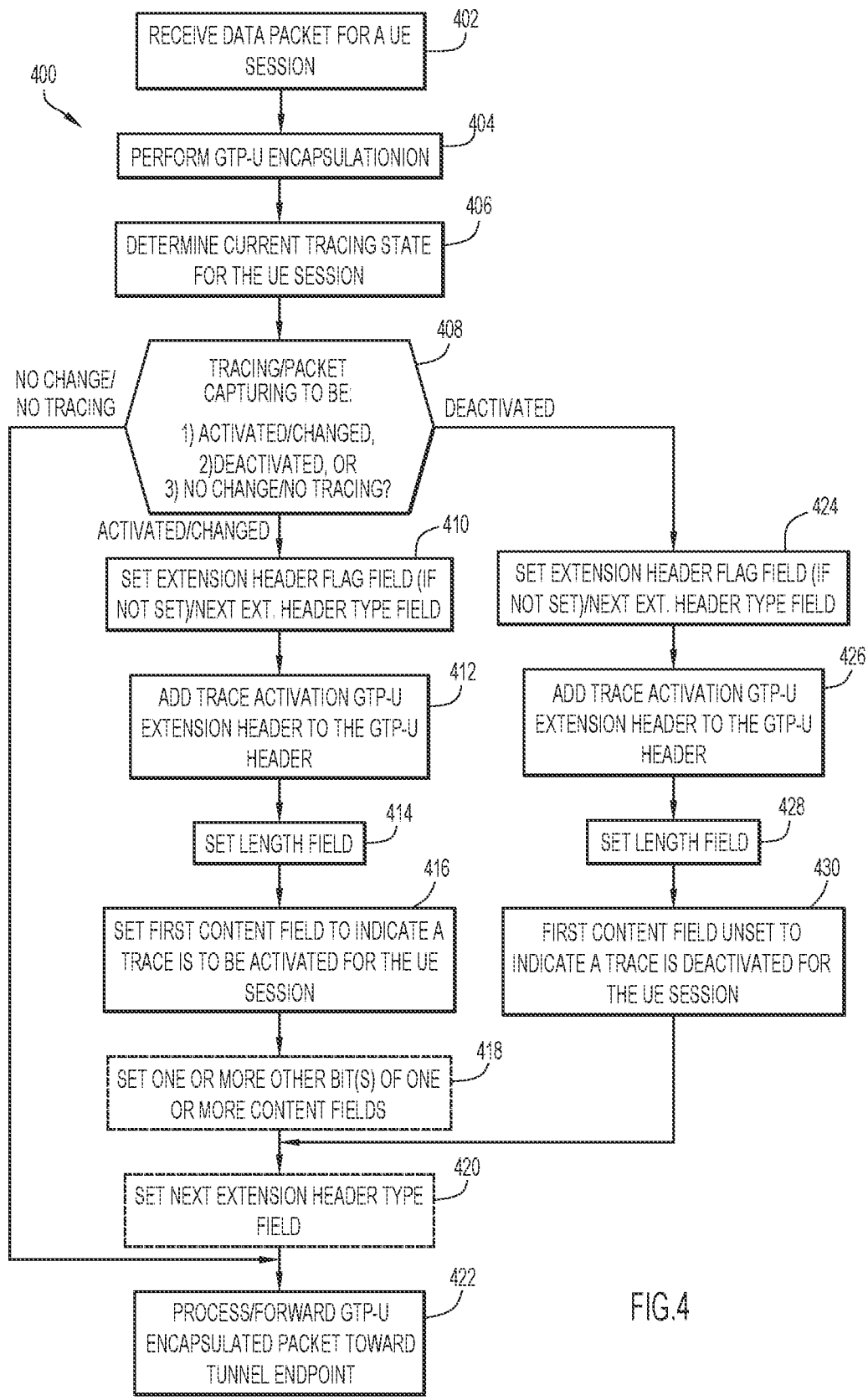
FIG. 4 is a simplified flow chart illustrating example operations associated with communicating an indication to activate, change, or deactivate packet capturing for a UE session using a GTP-U extension header, according to an example embodiment.

Referring to FIG. 4, FIG. 4 is a simplified flow chart illustrating example operations 400 associated with communicating an indication to activate, change, or deactivate tracing and packet capturing for a UE session using a GTP-U extension header, according to an example embodiment. In at least one embodiment, operations 400 may be performed by a data-path network element such as a PGW (e.g., PGW 108) and/or an SGW (e.g., SGW 106).

In at least one embodiment, operations 400 may include at 402, the data-path network element receiving data packet for a UE session. For example, PGW 108 may receive a data packet from PDN 116 for the UE 102(1) session. In another example, SGW 106 may receive a data packet from eNodeB 122 for the UE 102(1) session. At 404, the operations may include the data-path network element performing GTP-U encapsulation for the data packet.

At 406, the operations may include the data-path network element determining the current tracing state for the UE session. For example, the operations at 406 may include determining tracing information associated with the UE session, such as whether tracing is currently activated or deactivated for the UE session and, in some embodiments if tracing is currently activated for the UE session, the data-path network element can determine the intensity or level of tracing that is activated for the UE session.

At 408, the operations may include the data-path network element determining whether tracing/packet capturing is to be: 1) activated or changed (e.g., to a different intensity or level of tracing); 2) deactivated; or 3) that there is to be no change to currently activated tracing for the UE session or that there is no tracing activated for the UE session.

For example, the data-path network element can determine at 408 that tracing is to be activated or changed based on receiving an indication from an anomaly detection application and/or decision tree logic and determining, based on a comparison with the tracing information associated with current tracing state for the UE session, that the received indication indicates a different tracing state from the current tracing state for the UE session (e.g., either tracing is currently deactivated or is activated at a different intensity/ level for the UE session).

In another example, the data-path network element can determine at 408 that tracing for the UE session is to be deactivated automatically after a period of time, upon receiving an indication from an anomaly detection application (e.g., from anomaly detection application 130 external to the data-path network element or from an anomaly detection application configured for the data-path network element) and/or decision tree logic, or upon receiving an indication from another data-path network element and further determining that the tracing information associated with the current tracing state for the UE session indicates that tracing is currently activated for the UE session.

Otherwise, the data-path network element can determine at 408 that there is no change in comparison to the current tracing state for the UE session or that no tracing is activated for the UE session. For example, the data-path network element can determine that there is no change in comparison to the current tracing state for the UE session if tracing is already activated for the UE session at the data-path network element and it receives a notification to activate tracing for the UE session. A similar determination can be made that there is no change or no tracing is activated for the UE session in comparison to the current state for the UE session if tracing is already deactivated for the UE session at the data-path network element and it receives a notification to deactivate tracing for the UE session. Similar determinations could be made with regard to changes in tracing and other variations of determinations can be envisioned depending on tracing state and/or notifications received.

Based on a determination at 408 that tracing/packet capturing is to be activated or changed for the UE session, the operations may continue 410 at which the data-path network element sets, if it has not already been set, the Extension Header Flag field (e.g., field 301 of GTP-U header 300) to indicate that at least one GTP-U extension header will be included in the GTP-U header. Further at 410, in at least one embodiment, the data-path network element may set the Next Extension Header Type field (Next Extension Header Type field 305) to indicate a Trace Activation GTP-U extension header (e.g., type '1100 0011') is the next GTP-U extension header appended to the GTP-U header; however, in another embodiment, the data-path network element may set the Next Extension Header Type field of another GTP-U extension header of the GTP-U header to indicate a Trace Activation GTP-U extension header is the next GTP-U header extension if, for example, one or more other GTP-U extension headers precede the Trace Activation GTP-U extension header for the GTP-U header.

At 412, the operations include the data-path network element adding the Trace Activation GTP extension header (e.g., Trace Activation GTP-U extension header 310) to the GTP-U header, setting, at 414, the Length field (e.g., Length field 311) of the extension header appropriately, setting, at 416, the first Content field (e.g., first Content field 312*a*) in order to indicate that tracing/packet capturing is to be activated for the UE session, and, in some embodiments, setting, at 418, one or more other bit(s) of the first Content fields and/or any other Content fields (e.g., to indicate a level/intensity of tracing that is to be activated or changed) and/or setting, at 420, the Next Extension Header Type field (e.g., Next Extension Header Type field 313), if applicable. However, for embodiments in which one or more other Content fields may not be set and/or the Next Extension Header Type field may not be set, the operations may continue to 422 at which the data-path network element may process and forward the GTP-U encapsulated data packet toward a tunnel endpoint.

Based on a determination at 408 that tracing/packet capturing is to be deactivated for the UE session, the operations may continue to 424 at which the data-path network element sets, if it has not already been set, the Extension Header Flag field (e.g., field 301 of GTP-U header 300) to indicate that at least one GTP-U extension header will be included in the GTP-U header and further sets the Next Extension Header Type field to indicate a Trace Activation GTP-U extension header (e.g., type '1100 0011') is the next GTP-U extension header appended to the GTP-U header; however, in another embodiment, the data-path network element may set the Next Extension Header Type field of another GTP-U extension header of the GTP-U header to indicate a Trace Activation GTP-U extension header is the next GTP-U header extension if, for example, one or more other GTP-U extension headers precede the Trace Activation GTP-U extension header for the GTP-U header.

At 426, the operations include the data-path network element adding the Trace Activation GTP-U extension header to the GTP-U header, setting, at 428, the Length field of the extension header appropriately, and providing, at 430, that the first Content field (e.g., first Content field 312*a*) unset (or not setting it) in order to indicate that tracing/packet capturing is to be deactivated for the UE session. In some embodiments, the operations may include setting, at 420, the Next Extension Header Type field (e.g., Next Extension Header Type field 313), if applicable. However, in other embodiments the operations may continue to 422 at which the data-path network element may process and forward the GTP-U encapsulated data packet toward a tunnel endpoint.

Based on a determination at 408 that no change in tracing is needed for the UE session or no tracing is activated for the UE session, the operations can continue to 422 at which the data-path network element may process and forward the GTP-U encapsulated toward a tunnel endpoint.

Figure 5:
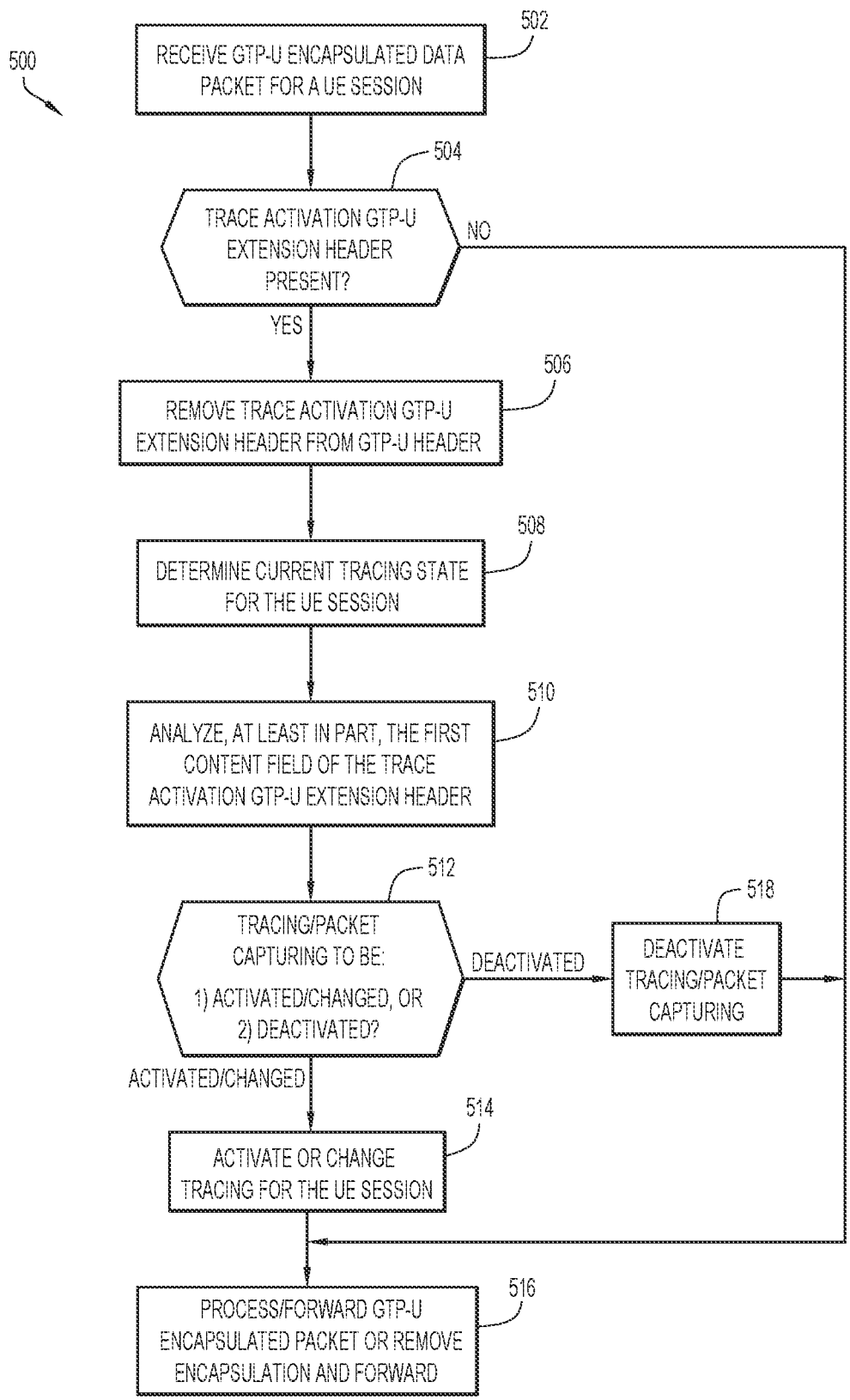
FIG. 5 is a simplified flow chart illustrating example operations associated with activating, changing, or deactivating packet capturing for a user equipment (UE) session based on receiving a GTP-U encapsulated data packet, according to an example embodiment.

Referring to FIG. 5, FIG. 5 is a simplified flow chart illustrating example operations 500 associated with activating, changing, or deactivating tracing and packet capturing for a UE session based on receiving a GTP-U encapsulated data packet including a GTP-U extension header associated with tracing, according to an example embodiment. In at least one embodiment, operations 500 may be performed by a data-path network element such as a PGW (e.g., PGW 108) and/or an SGW (e.g., SGW 106).

In at least one embodiment, operations 500 may include at 502, the data-path network element receiving a GTP-U encapsulated data packet for a UE session. For example, SGW 106 may receive GTP-U encapsulated data packet 113 from PGW 108 for the UE 102(1) session. In another example, PGW 108 may receive a GTP-U encapsulated data packet for the UE 102(1) session from SGW 106.

At 504, the operations include the data-path network element determining whether the Trace Activation GTP-U extension header is present within the GTP-U header of the encapsulated data packet. Based on a determination at 504 that no Trace Activation GTP-U extension header is present for the GTP-U header, the operations may continue to 516 at which the data-path network element may process and forward the GTP-U encapsulated data packet toward a tunnel endpoint or remove the encapsulation and forward the data packet.

Based on a determination at 504 that a Trace Activation GTP-U extension header is present for the GTP-U header, the operations continue to 506 at which the data-path network element removes the Trace-Activation GTP-U extension header from the GTP-U header.

At 508, the operations may include the data-path network element determining the current tracing state for the UE session. For example, the operations at 508 may include determining whether tracing is currently activated or deactivated for the UE session and, in some embodiments if it is currently activated, the data-path network element can determine the intensity or level of tracing that is activated for the UE session.

At 510, the operations may include the data-path network element analyzing, at least in part, the first Content field of the Trace Activation GTP-U. For example, the data-path network element can parse/analyze the first bit of the first Content field to determine whether it is set or not set in order to determine at 512 whether tracing/packet capturing is to be activated or deactivated for the UE session. In some embodiments, the data-path network element may analyze, at 510, one or more other bits of the first Content field and/or of one or more other Content fields of the Trace Activation GTP-U extension header in order to determine at 512 a level or intensity of tracing/packet capturing associated with the UE session.

Based on the analysis at 510, the operations include the data-path network element determining, at 512, whether tracing/packet capturing is to be: 1) activated or changed for the UE session or 2) deactivated for the UE session. The operations at 512 may include the data-path network element performing a comparison between the tracing information determined from the Content field(s) and tracing information associated with the current tracing state for the UE session.

Based on a determination at 512 that tracing/packet capturing is to be activated or changed for the UE session, the operations continue to 514 at which the data-path network activates tracing/packet capturing for the UE session or changes the intensity or level for tracing/packet capturing for the UE session and the operations continue to 516 at which the data-path network element may process and forward the GTP-U encapsulated data packet toward a tunnel endpoint or remove the encapsulation and forward the data packet.

Based on a determination that tracing/packet capturing is to be deactivated for the UE session, the operations continue to 518 at which the data-path network element deactivates tracing/packet capturing for the UE session and the operations continue to 516 at which the data-path network element may process and forward the GTP-U encapsulated data packet toward a tunnel endpoint or remove the encapsulation and forward the data packet.

Various operations that may be associated with tracing/packet capturing are discussed in further below with reference to FIGS. 6A-6B, according to an example embodiment.

Figure 6A:
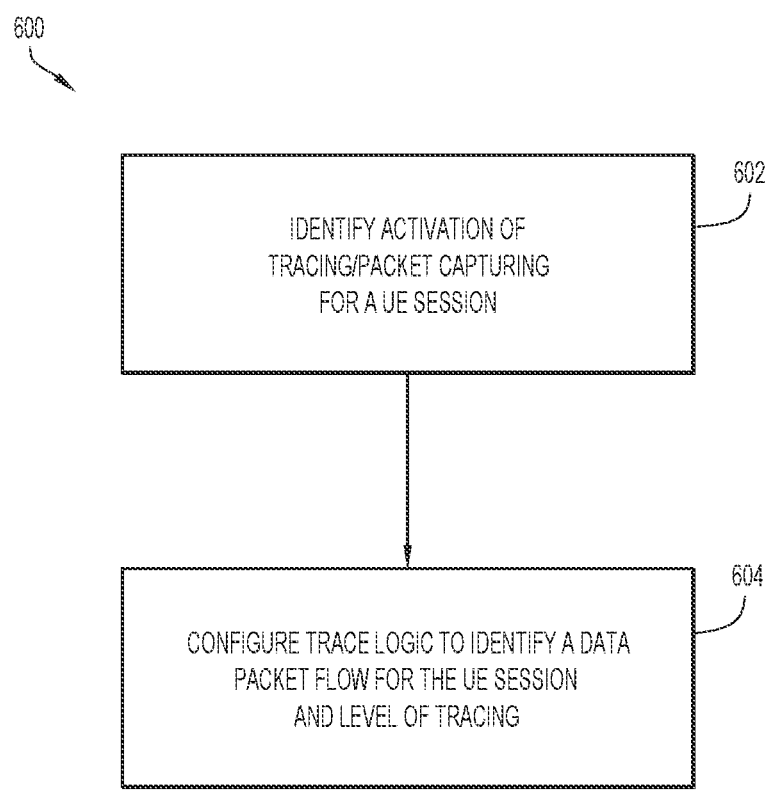
FIG. 6A is a simplified flow chart illustrating example operations associated with configuring tracing for a UE session, according to an example embodiment.

Referring to FIG. 6A, FIG. 6A is a simplified flow chart illustrating example operations 600 associated with configuring tracing for a UE session, according to an example embodiment. In at least one embodiment, operations 600 may be performed by a data-path network element such as a PGW (e.g., PGW 108) and/or an SGW (e.g., SGW 106).

In at least one embodiment, operations 600 may include, at 602, identifying activation of tracing/packet capturing for a UE session (e.g., via different activation methods discussed herein). At 604, the operations may include configuring trace logic of the data-path network element (e.g., via control/management logic for the data-path network element) to identify a data packet flow for the UE session for which tracing/packet capturing is activated. In various embodiments, the operations at 604 may include configuring one or more subscriber classification tables (e.g., ACLs based on N-tuple information, LPMs, hashes, hash tables, etc.) to identify the data packet flow for the UE session and configuring trace logic of the data-path network element to provide a level/intensity of tracing/packet capturing (e.g., full, partial, level of partial, capturing all data packets, capturing bursts of data packets, etc.), based on the tracing/packet capturing activation identified for the UE session. In at least one embodiment, guidance for a level/intensity of tracing may be co-located within the same ACLs, N-tuple, hash table results, etc. as the initial guidance to activate tracing for a flow. In some embodiments, the level/intensity of tracing may be reconfigured based on receiving a notification to change the level/intensity. Operations 602 and 604 may be performed asynchronous with packet processing by a data-path network element.

Figure 6B:
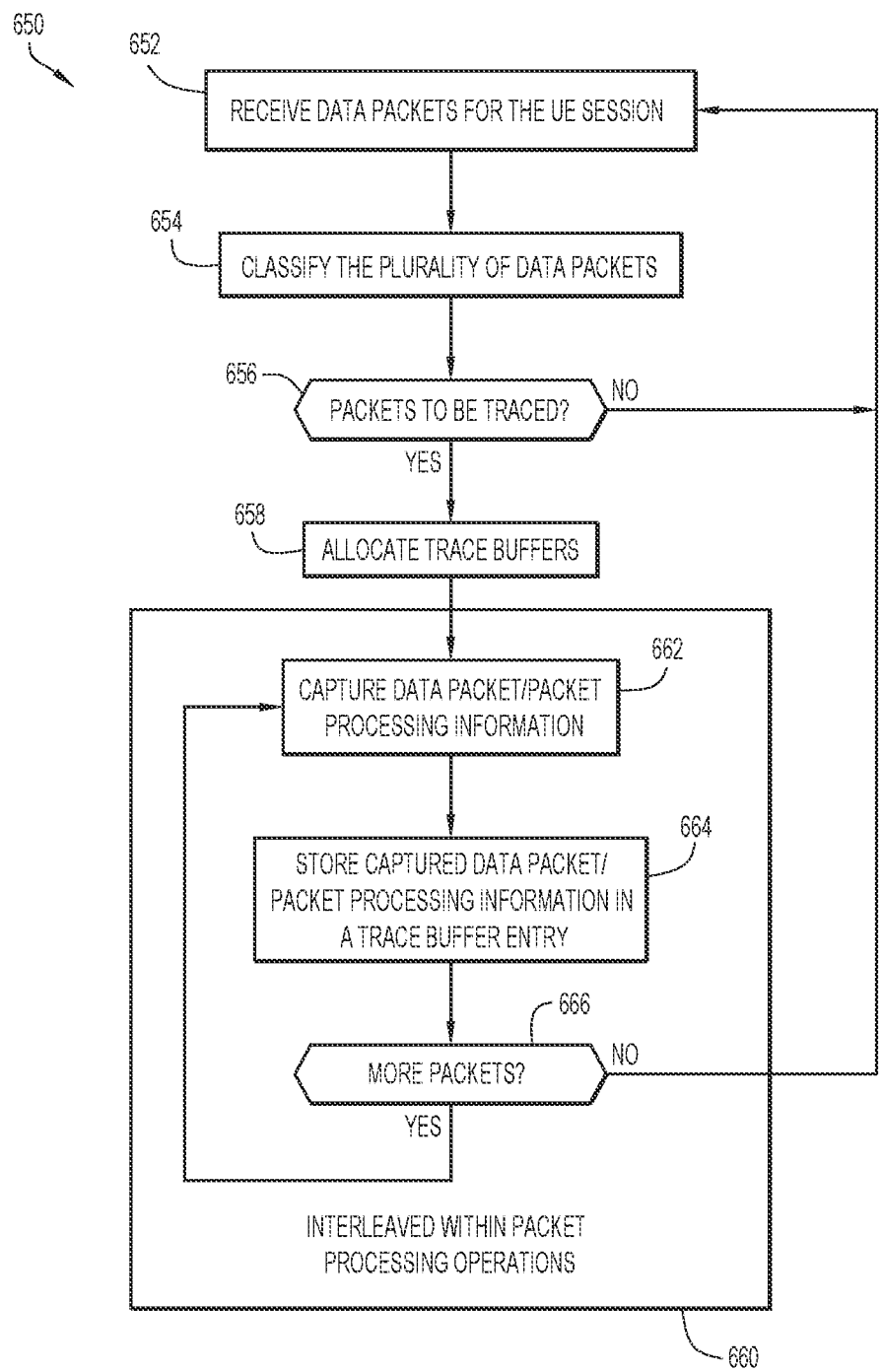
FIG. 6B is a simplified flow chart illustrating example operations associated with packet capturing for a UE session for which tracing has been activated, according to an example embodiment.

Referring to FIG. 6B, FIG. 6B is a simplified flow chart illustrating example operations 650 associated with capturing packets for a UE session for which tracing has been activated, according to an example embodiment. In at least one embodiment, operations 650 may be performed by a data-path network element such as a PGW (e.g., PGW 108) and/or an SGW (e.g., SGW 106).

At 652, the operations may include the data-path network element receiving data packets for a data packet flow of the UE session. In various embodiments, the data packets may be received via one or more ports for the data-path network element. At 654, the operations may include the data-path network element classifying the data packets based on the configuration operations as discussed at 604. At 656, the operations may include the data-path network element determining, based on the classification at 654, whether the packets are to be traced.

Based on a determination at 656 that the data packets are not to be traced, the operations may return to 652 at which additional data packets for the UE session may be received. Based on a determination at 656 that the packets are to be traced, the operations may continue to 658 at which the operations may include the data-path network element allocating trace buffers associated with the packets for storing trace data for the tracing/packet capturing. In at least one embodiment, the operations at 658 may include allocating a trace buffer for each received data packet. The trace buffers may be allocated via one or more memory elements for the data-path network element.

Following the allocation of the trace buffers 658, the operations can continue to data packet capturing operations 660 in order to capture, at 662, on a per packet basis and interleaved with the data plane packet processing operations that may be performed by the data-path network element, data packet information and/or packet processing information for a data packet of the plurality of data packets for the data packet flow. Different data plane packet processing operations may include but not be limited to: performing forwarding/routing decisions, updating statistics/counters for accounting traffic management (e.g., rate policing or shaping), and/or packet modifications (e.g., transforming the data).

At 664, the operations may include the data-path network element storing the captured data packet in a trace buffer associated with the captured data packet. At 666, the operations may include the data-path network element determining whether there are any additional data packets to be processed. Based on a determination at 666 that there are additional data packets to be processed, the operations may return to 662 and continue therefrom. Based on a determination at 666 that there are no additional data packets to be processed, the operations may return to 652 at which additional data packets may be received for the UE session and the operations may continue therefrom.

As discussed previously herein, decision tree logic may be configured for data-path network elements (e.g., SGW 106 and/or PGW 108) to facilitate intelligent tracing and packet capturing within the data-path of data packet flows of UE 102(1)-102(N) sessions.

Post-mortem analysis of failures in a live network is exceedingly difficult, and would be greatly enhanced by the availability of data about the network and data plane in the crucial moments leading up to a failure. In similar circumstances, airplane manufacturers depend upon flight data recorders, also known as black boxes.

Unfortunately, most data planes have no support for 'black box' type functionality, nor the resources (memory, compute, storage, etc.) to deal with the massive volumes of data from capturing all available data (including packets), thus, intelligent processing decisions can be advantageous.

Techniques implemented via mobile network 100 provide for the ability to configure predictive logic, such as decision tree logic 107/109, for data-path network elements to select packet flows of interest (e.g., for which potential anomalies may occur) for packet tracing, thereby ensuring that when failures occur, data is already available to assist with debugging and postmortem analysis.

In various embodiments, predictive decision tree logic described herein may draw on operational information that already exists in the data plane of data-path network elements, such as packet drops statistics, Layer 3 (L3) (and other network) addresses, metadata from exception scenarios (e.g., timestamps, associated flows, associated ports, Virtual Routing and Forwarding (VRF) information, etc.), any other statistics/information/etc., combinations thereof, and/or the like to predict potential anomalies with one or more data packet flow(s) of UE 102(1)-102(N) to intelligently trigger activation of tracing/packet capturing of one or more data packet flows at a data-path network element, such as SGW 106 and PGW 108.

During operation, local network nodes processing traffic, such as SGW 106 and PGW 108 experience subtle clues that all is not well with the packet flows that it handles, for example, the percentage of traffic experiencing errors may accelerate on a particular traffic or data packet flow; the percentage of traffic matching expected N-tuple flows experiences changes and begins to look dramatically different from the norm; the volume of exception traffic sent to adjunct processing elements escalates; the volume of logs generated for a particular data packet flow increases; among others. All these markers are hints that a particular traffic flow may be experiencing trouble. Traditionally, such hints are processed manually, usually in post-mortem analysis.

In at least one embodiment, techniques implemented via mobile network 100 may use decision tree analytics to combine such hints into a decision to proactively and intelligently activate tracing and packet capturing one or more data packet flows for one or more UE 102(1)-102((N) sessions based on determinations using the analytics.

Figure 7:
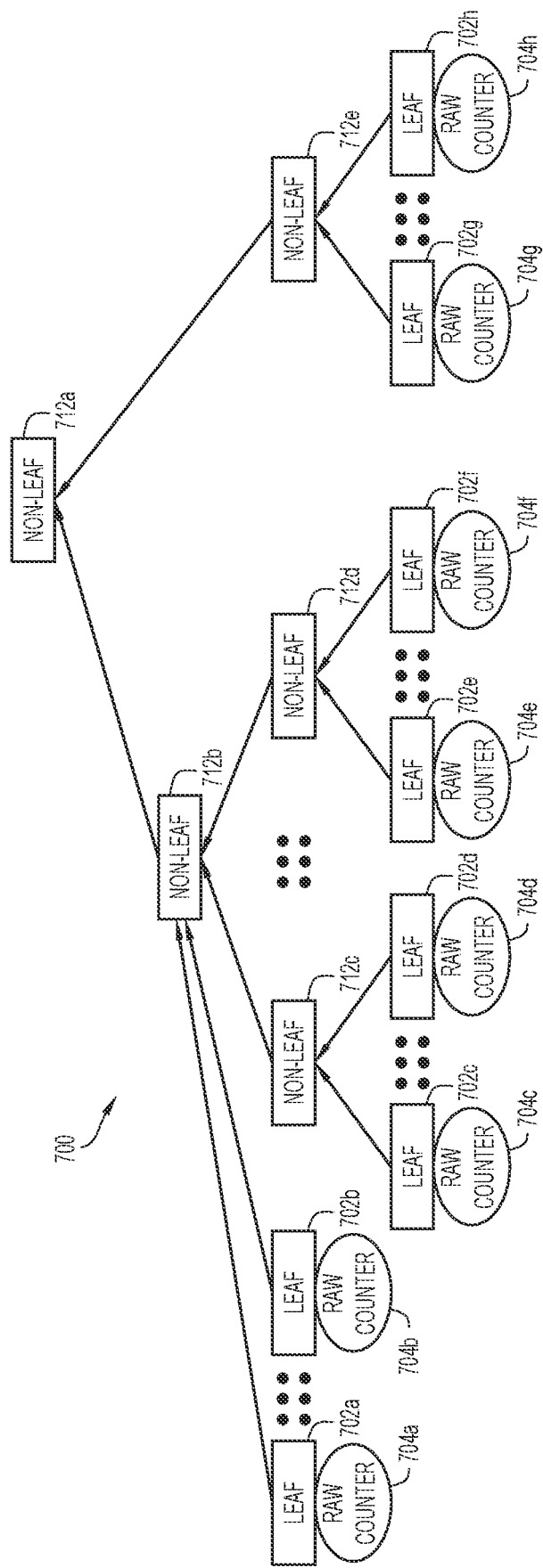
FIG. 7 is a simplified diagram illustrating a decision tree that may be implemented via decision tree logic configured for a data-path network element, according to an example embodiment.

Referring to FIG. 7, FIG. 7 is a simplified diagram illustrating a decision tree 700 that may be implemented via decision tree logic configured for a data-path network element, according to an example embodiment. In at least one embodiment, decision tree 700 may include leaf nodes 702, shown in FIG. 7 as leaf nodes 702a-702h and non-leaf nodes 712, shown in FIG. 7 as non-leaf nodes 712a-712e. In at least one embodiment, respective raw counters 704, shown in FIG. 7 as raw counters 704a-704h, may be associated with respective leaf nodes 702a-702h.

In general, leaf nodes 702 may be characterized as being at the lower extremities of decision tree 700 and serve as input points for raw operational data of a data-path network element, such as count data (e.g., raw counts) or statistical data (e.g., packet count statistics, packet drop statistics, number/percentage of errors for certain types of traffic/flows, number of lines in a log file, number/percentage of errors for a certain reason, number of seconds since some event, number of inactive ports on a network element, etc.) from raw counters 704 that can be incorporated into decision tree 700 analytics. Raw operational data may be of any form such as a flag that is '1' or '0', may be multi-bit data, and/or may be one or more bytes of data. In some embodiments, inputs to decision tree 700 via one or more leaf nodes 702 may be user and/or operator inputs. For example, this could be an enable or disable flag (e.g., whether to propagate tracing decisions to a nearby node) that is configurable by a user/operator. In some embodiments, user/operator inputs may be fed into decision tree 700 to effectively enable or short-circuit a decision tree outcome. Thus, leaf nodes 702 may represent touch-points to the 'outside' world. In general, non-leaf nodes 712 may represent the 'glue' that binds together leaf nodes 702 and, in some instances, other non-leaf nodes.

In general, decision tree 700 may represent a construct that allows numerical hints (such as error counters, logging counters, exception counters, statistical counters, etc. provided via raw counters 704) to be aggregated together using a hierarchical representation of a formula in which outcomes/actions/operations (e.g., activating tracing and packet capturing) may be driven by the formula. In various instances, decision tree 700 may combine leaf nodes 702 into non-leaf nodes 712, may combine both leaf 702 nodes and non-leaf nodes 712 into other non-leaf nodes 712, and/or may combine non-leaf nodes 712 into other non-leaf nodes 712 (e.g., combining outputs of non-leaf nodes 712b and 712e as inputs for non-leaf node 712a).

A decision tree has a parent node, which is a non-leaf node that aggregates from lower level non-leaf nodes, typically referred to as intermediate nodes, to trigger an ultimate decision for the decision tree. For the embodiment of FIG. 7, a non-leaf node 712a is the parent decision tree node while non-leaf nodes 712b-712e are intermediate nodes for decision tree 700.

Decision tree 700 nodes (leaf nodes 702 and non-leaf nodes 712) may utilize Boolean logic or numeric logic (e.g., some pre-configured formula) to evaluate input data, either raw input data from a counter or input data from another decision tree node. A node that utilizes Boolean logic may be referred to generally as a Boolean node. A node that utilizes numeric logic, may be referred to as a numeric node.

Boolean nodes produce a result/value of '1' (True) or '0' (False) and are typically used to assess an input 'X' by performing some function (X), in which the function may have zero or more additional parameters. The input to Boolean nodes may be a raw counter/statistic or may be the result of another node. Various example Boolean functions may include, but not be limited to:

Value=operator(X, Y), which performs a comparison of X against Y (e.g., a threshold), for example, using operators such as: $\neq$, $-$, $\geq$, $\leq$, $>$ or $<$ and any combination thereof (e.g., for complex formulas). In various examples, X and/or Y may be a raw value or may be a value for which some numeric value has been calculated.

Value=logical operator(X, Y), which performs a comparison of X and Y using logical operators such as AND, NAND, OR, NOR, XOR, XNOR, etc. and any combination thereof in which X and Y may be logical values. Consider an intermediate node example such as, intermediate node X output value=(leaf node Y output value) AND (!leaf node Z output value).

Other variations, types, and/or complexities for Boolean logic for a Boolean node can be envisioned and, thus, are clearly within the scope of the present disclosure.

Numeric nodes produce a numeric (e.g., signed integer) result/value and are typically used to assess an input 'X' by performing some function(X), in which the function may have zero or more additional parameters. The input to numeric nodes may be a raw counter/statistic or may be the result of another node. Various example numeric functions may include, but not be limited to Value=delta(X, T), which computes a change in X over a time T.

Value=meter(X, config), which performs metering (policing) on a value X using a given metering configuration and assesses the metering output/result in terms of a color match in which the output value is 0=Green, 1=Yellow, 2=Red. Thus, in some embodiments, decision tree leaf nodes may perform a sophisticated evaluation based on token bucket algorithms that use more sophisticated evaluation techniques such as single rate three color markers (srTCM) (e.g., Green, Yellow, Red).

Value=sum(X, Y, . . . Z), which computes the sum of all input values and assesses the sum output in terms of a total of the inputs.

Other variations, types, and/or complexities for numeric functions for a numeric node can be envisioned and, thus, are clearly within the scope of the present disclosure.

Nodes may have a state, which is the current output value of the node. For numeric nodes, state is the current signed integer value. For Boolean nodes, state is '0' (False) or '1' (True). In some instances, nodes may have an action that allow the decision tree to initiate operations based on a consequence of changing state.

During operation, each leaf node 702 of decision tree 700 evaluates a single criterion (e.g., a single data point), using Boolean logic and/or a numeric logic based on some pre-configured formula.

Outputs from leaf nodes 702 are combined into intermediate non-leaf nodes 712 to aggregate the decisions using Boolean logic and/or numeric logic in order to determine output values. Further, the parent decision tree non-leaf node (e.g., non-leaf node 712*a*) aggregates outputs from the intermediate nodes, also using Boolean or numeric logic to trigger an output decision, such as a decision of whether to activate or deactivate tracing for a data packet flow.

It should be noted that the example decision tree 700 illustrated in FIG. 7 is provided for illustrative purposes only and is not meant to limit the broad scope of the present disclosure. Any number of levels of logic may be provided for a decision tree in accordance with embodiments described herein. Thus, there does not need to be an upper limit to the number of levels in the hierarchy of a decision tree, though performance may impact some level of pragmatism for implementation.

In addition to a binary yes/no decision for tracing a data packet flow or logical entity (e.g., a port or Virtual Local Area Network (VLAN)), the decision tree approach to guiding packet tracing can also provide intensity guidance to the tracing algorithms (e.g., trace logic).

This is particularly valuable when the size or scope of a logical entity makes tracing of the all packets untenable in a live Customer environment. For example, tracing every data packet of an entire physical port can have significant performance impacts on the system, and would therefore be considered unpalatable. A better alternative may be to trace every packet but capture less information, and/or capture exceedingly short bursts of traffic before stopping tracing.

Thus, in at least one embodiment of mobile network 100, intensity can be evaluated using more advanced decision tree nodes like token buckets that are capable of providing output colors, for example, green=full trace, yellow=medium trace, red=no trace (e.g., using metering operations). Alternately, in some embodiments, thresholds can be evaluated on a scale, for example, breaching threshold by up to 25% yields a light tracing decision, whereas breaching the threshold by more than 75% yields a strong tracing decision.

Thus, in various embodiments, the output decision from a parent decision tree node (e.g., non-leaf node 712*a* of decision tree 700) may be a determination of whether to activate/deactivate a trace on a data packet flow or not (e.g., a True/False determination), whether to trace a data packet flow at a given trace level/intensity (e.g., full trace (Green), no trace (Red), or medium trace (Yellow)), whether to change a trace level/intensity for a data packet flow, whether to communicate a tracing action to another data path network element, combinations thereof, and/or the any other decisions/tracing related actions that may be envisioned for anomaly detection and tracing/packet capturing environments.

For embodiments of mobile network 100, multiple instances of a decision tree (e.g., decision tree 700) may exist in which each instance of a decision tree is dedicated to a single data packet flow in order predict potential anomalies the data packet flow for a given UE session and to intelligently trigger activation of tracing/packet capturing of data packet flow of the UE session at a data-path network element. Thus, when a parent decision tree node makes a tracing related decision (e.g., to activate tracing) for a data packet flow, the data packet flow is already implied/identified for tracing, as the data packet flow is the 'owner' of the tree instance. Tracing may be initiated by making a local request (through the management plane) to trace logic that may be configured for a data-path network element to begin packet tracing/monitoring of the data packet flow.

In at least one embodiment, the initial configuration of decision tree leaf node formulas and/or thresholds for decision tree logic 107 that may be configured for SGW 106 and decision tree logic 109 that may be configured for PGW 108 may be set at system initialization time, based initially on data manually derived from study and/or evaluation of similar network nodes and their expected behaviors. However, in some embodiments, machine learning (ML) algorithms may be utilized to regulate the thresholds by 'learning', over time, the difference between healthy and unhealthy data packet flows and driving such data back into the decision tree node thresholds.

It is important to note that decision tree logic of a data-path network element (or, more precisely, evaluations of the formulas and aggregation to an ultimate decision at the parent node) is executed in the management plane (i.e., outside the data plane), to reduce packet processing overheads. Because data planes are heavily optimized for performance, any processing cycles that detracts from packet processing is generally avoided as much as possible. Because error counters and logs are a natural part of packet processing, these typically remain in the data plane. By locating such counters in shared memory, for example, the counters become accessible to adjunct processing elements (such as other cores/threads dedicated to management or control plane functions). Thus, in at least one embodiment, execution of decision tree node formulas and aggregation to an ultimate decision may be considered part of the management plane of a data-path network element.

For example, in Cisco® VPP-based ASR5500 and VPC products, the data plane is managed by an entity known as an NPU Manager. NPU Manager already has the responsibility to collect, monitor, and aggregate counters from the data planes it oversees. The counters used as inputs into the decision tree leaf nodes are data points already visible and tracked by management software.

At a macro level, the same decision tree techniques can be applied to higher level logical or physical constructs, such as entire ports or VLANs. In fact, the same technique can be applied to any logical and/or physical construct that is represented by data collected in the data plane.

Figure 8:
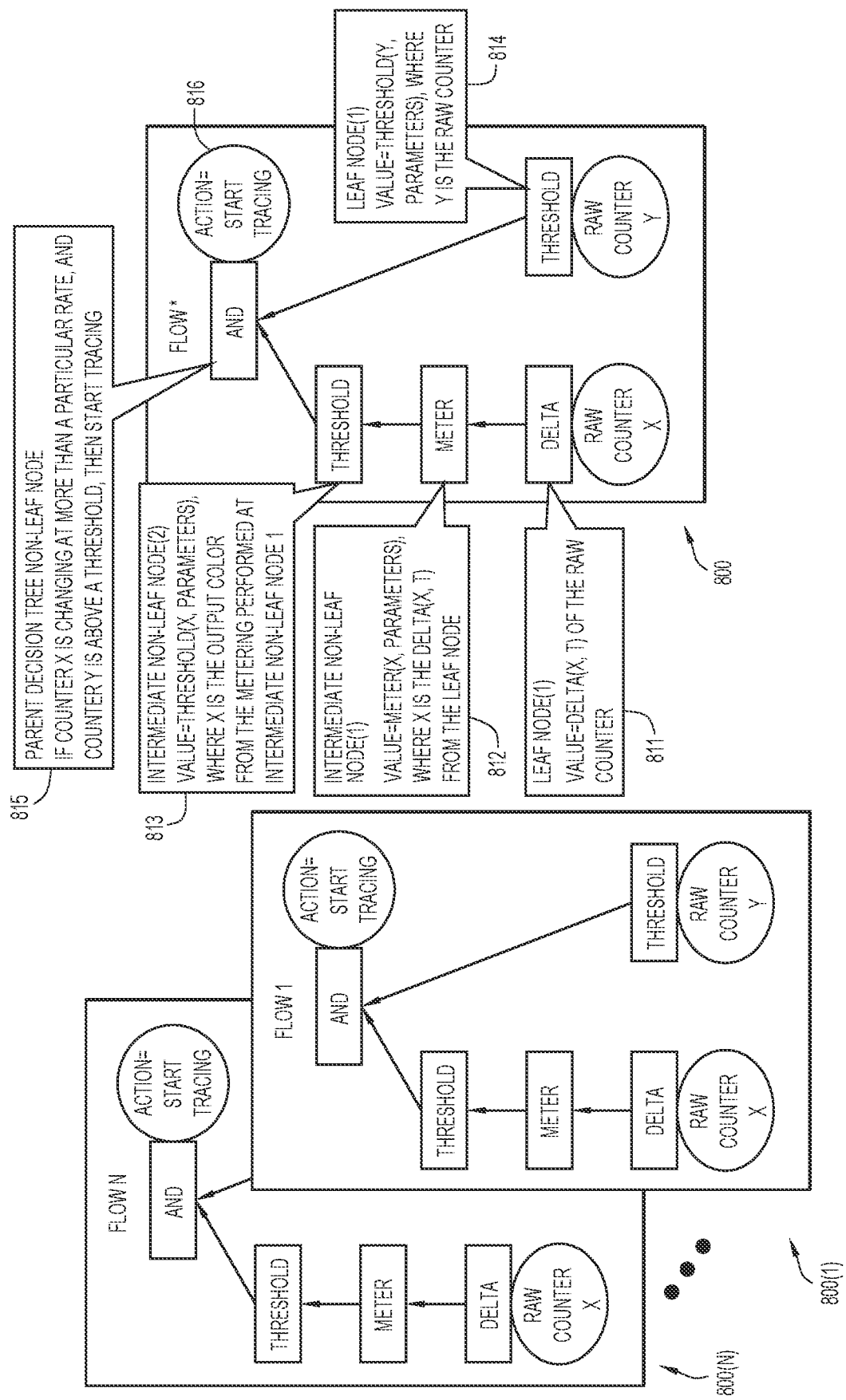
FIG. 8 is a simplified diagram illustrating example decision tree operations that may be facilitated via decision tree logic configured for a data-path network element to predict a potential anomaly for a UE session, according to an example embodiment.

Referring to FIG. 8, FIG. 8 is a simplified diagram illustrating example decision tree operations that may be facilitated via decision tree logic 800 configured for a data-path network element to predict potential anomalies associated with a UE session, according to an example embodiment. FIG. 8 illustrates example operations 811-816 associated with decision tree logic 800, according to an example embodiment. Further, FIG. 8 illustrates per-flow instances 800(1)-800(N) of decision tree logic 800 that may respectively be instantiated to determine whether tracing and packet capturing is to be activated for respective per-subscriber data flows, for example, for respective UE 102(1)-102(N) sessions, according to an example embodiment.

Example decision tree logic 800 operations that may be associated with a data packet flow for a UE session are now discussed. In at least one embodiment, at 811, the operations may include a leaf node (1) determining an output value based on a function 'delta(X, T)' using counter data that is input to leaf node (1) from Raw Counter X associated with leaf node (1). At 812, the operations may include an intermediate non-leaf node (1) determining an output value based on a function 'meter(X, parameters)' where the meter operation input value X is the output value from the delta operation of leaf node (1). At 813, the operations may include an intermediate non-leaf node (2) determining an output value based on a function 'operator(X, parameters)' where input X is the output from the metering operation performed at intermediate non-leaf node (1). At 814, the operations may include a leaf node (2) determining an output value based on a function 'operator(Y, parameters)' using counter data from Raw Counter Y associated with leaf node (2).

At 815, the operations may include the parent decision tree non-leaf node determining an output decision of whether to perform an action to start tracing at 816, based on whether Raw Counter X is changing more than a particular rate (e.g., Meter(Delta(X), meterParams) >=1) AND whether Raw Counter Y is above a threshold in which tracing is activated if Raw Counter X is changing more than the particular rate and Raw Counter Y is above the threshold.

In one example, each respective instance 800(1)-800(N) of decision logic 800 can be used to activate tracing for each data packet flow of each respective subscriber/UE 102(1)-102(N) session.

For embodiments in which intelligent tracing and packet capturing may be configured for one or more network elements such as SGW 106 via decision tree logic 107 and PGW 108 via decision tree logic 109, these network elements may also be configured to capture and store parameters and/or attributes for one or more UE 102(1)-102(N) sessions within an internal database for each network element in order to maintain historical information for the UE sessions to facilitate intelligent tracing and packet capturing operations.

As discussed previously, one data-path network can make a request to another local data-path network element node for tracing to start and stop using in-band Trace Activation GTP-U extension headers and/or using out-of-band signaling/messages. Thus, per-subscriber issue prediction at one network element can be used to alert and capture detail logs and debug info in other mobile packet core 140 nodes.

Once one data-path network element determines a tracing activation, the data-path network element can circulate requests to other nodes via Trace Activation GTP-U extension headers provided for data packets. Thus, in at least one embodiment, predictive decision tree logic may also be used to trigger packet tracing decisions in other network elements. In at least one embodiment, subscriber-related events in a SGW 106 node can be used to trigger tracing behaviors in the PGW 108 (and/or vice-versa) using Trace Activation GTP-U extension headers. In one example, based on a Finite State Machine (FSM) state of per-subscriber events in one node, the node may predict potential anomalies/issues that may occur in another node. For example, based on a per-subscriber event state machine for a given subscriber in SGW 106, SGW 106 can predict a potential issue may occur for the subscriber in PGW 108 and trigger trace activation for the subscriber in PGW 108. In another example, potential issues may be predicted on a per-subscriber basis based on messages and/parameters parameter sent from subscriber/UE to a mobile packet core node. For example, this data can be compared against supervised ML-based data maintained through an Issue/Ticket system (e.g., based on previously seen issue per subscriber and their associated messages and parameters exchanged) to predict a potential issue for a subscriber.

In accordance with embodiments of mobile network 100, any type of per-subscriber issue prediction in a data-path network element within mobile packet core 140 can help trigger full packet capture and detail/verbose log capture for one or more UEs/subscribers in other mobile packet core 140 data-path network elements. In some embodiments, an indication to capture detail information for one or more UEs/subscribers can be exchanged with other mobile packet core 140 nodes (e.g., MME 104, PCRF 110, etc.) using 3GPP messages augmented with vendor specific parameters indicating information capture for the UEs/subscribers.

Figure 9:
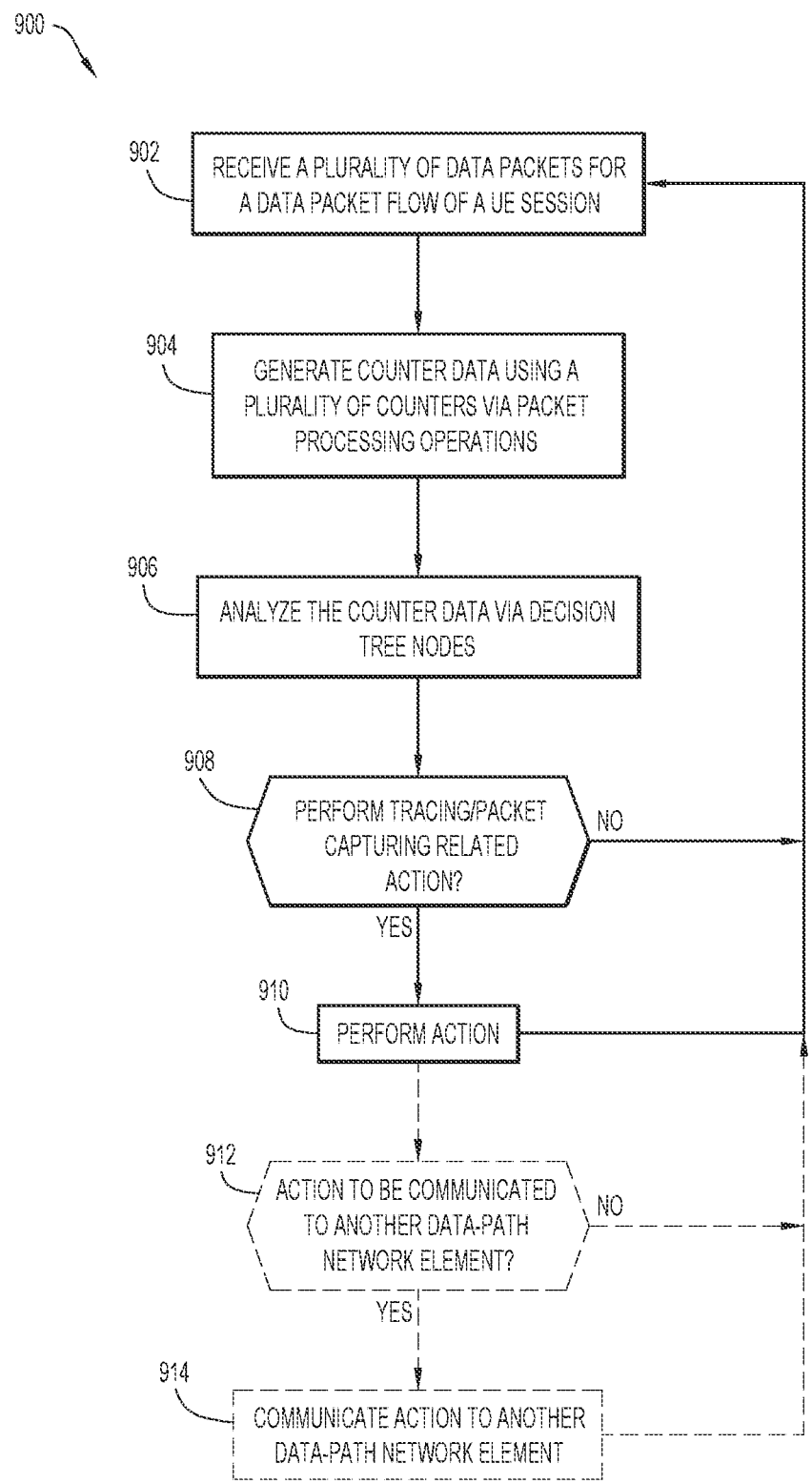
FIG. 9 is a simplified flow chart illustrating example operations associated with intelligent tracing and packet capturing techniques that may be performed by a data-path network element, according to an example embodiment.

Referring to FIG. 9, FIG. 9 is a simplified flow chart illustrating example operations 900 associated with intelligent tracing and packet capturing techniques that may be performed by a data-path network element, according to an example embodiment. In at least one embodiment, operations 900 may be performed by a data-path network element using, at least in part, decision tree logic configured for the data-path network element (e.g., SGW 106 via decision tree logic 107 or PGW 108 via decision tree logic 109) in order to predict potential anomalies associated with at least one UE session and perform one or more tracing related actions.

In at least one embodiment, operations 900 may include, at 902, receiving a plurality of data packets for a data packet flow of a UE session. At 904, generating counter data using a plurality of counters via packet processing operations performed by the data-path network element (e.g., data plane packet processing). At 906, the operations may include analyzing the counter data via decision tree nodes. At 908, the operations may include determining (e.g., by a decision tree parent node) whether to perform a tracing/packet capturing related action for the data packet flow. In various embodiments, tracing/packet capturing related actions may include any actions as discussed herein such as, for example, activating tracing/packet capturing for a data packet flow, deactivating tracing/packet capturing for a data packet flow, adjusting/changing tracing/packet capturing level or intensity for a data packet flow, combinations thereof, and/or any other tracing/packet capturing related actions as discussed herein.

Based on a determination at 908 that no tracing/packet capturing related action is to be performed, the operations may return to 902 at which additional data packets may be received and the operations may continue therefrom.

However, based on a determination at 908 that a tracing/packet capturing related action is to be performed, the operations may continue to 910 at which the tracing/packet capturing actions are performed for the data-path network element and the operations may return to 902. In various embodiments, tracing/capturing related actions can be performed by any combination of logic/operations etc. (e.g., control/management logic, trace logic, subscriber management logic, etc.) that may be executed by one or more processors configured for the data-path network element. In some embodiments, the operations following 910 may include an additional decision tree determination at 912 as to whether the tracing/capturing related action is to be communicated to another data-path network element. Based on a determination at 912, that the action is to be communicated to another data-path network element, the operations may continue to 914 at which the data-path network element communicates the tracing/packet capturing related action to another data-path network element (e.g., using an in-band Trace Activation GTP-U extension header included within a GTP-U encapsulated data packet and/or using any other out-of-band messaging/signaling) and the operations may return to 902 at which additional data packets may be received and the operations may continue therefrom. However, based on a determination at 912 that the action is not to be communicated to another data-path network element, the operations may return to 902 at which additional data packets may be received and the operations may continue therefrom.

Figure 10:
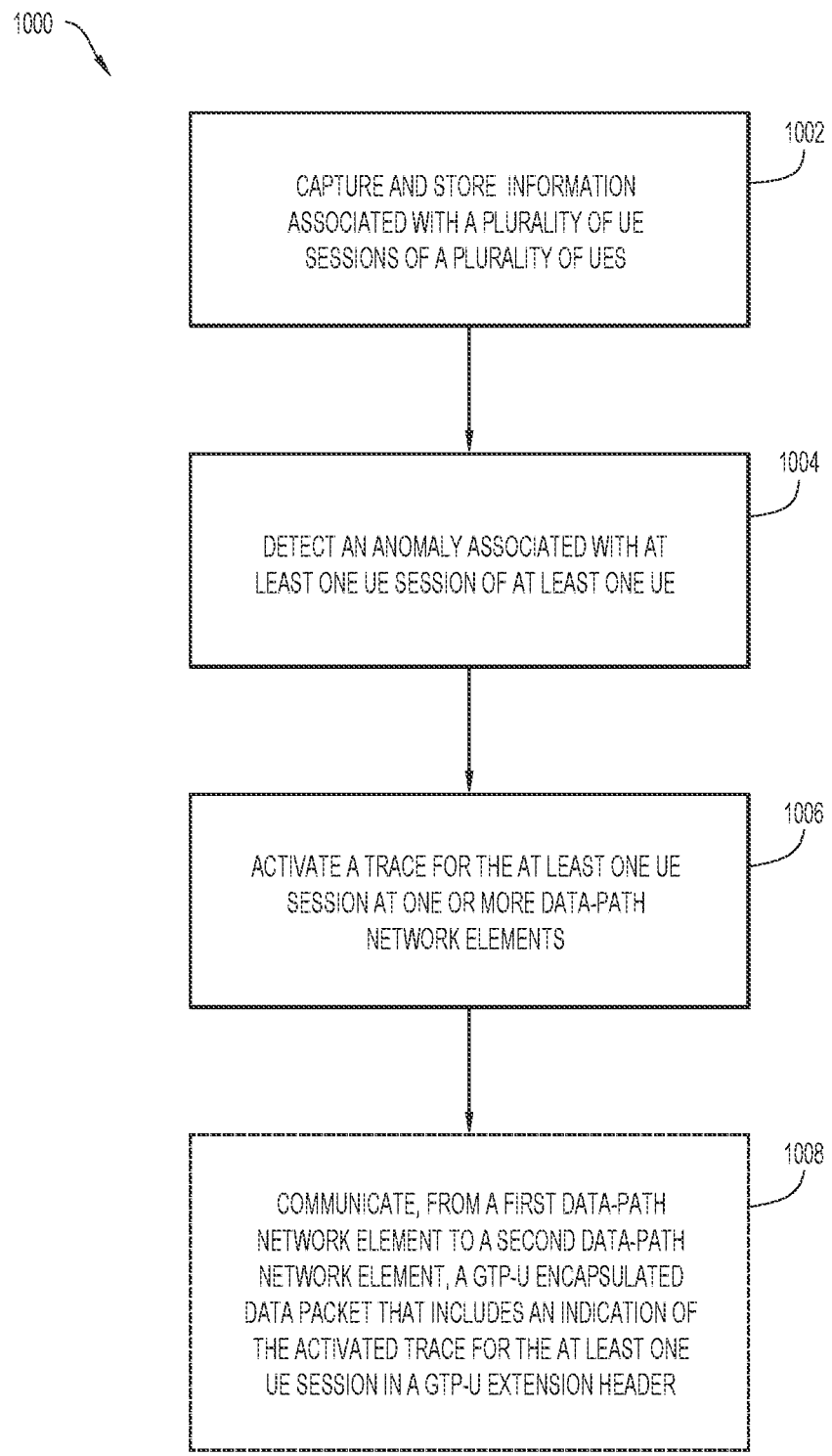
FIG. 10 is a simplified flow chart illustrating example operations associated with proactive and intelligent tracing and packet capturing techniques, according to an example embodiment.

Referring to FIG. 10, FIG. 10 is a simplified flow chart illustrating example operations 1000 associated with proactive and intelligent tracing and packet capturing techniques, according to an example embodiment. Operations 1000 may be performed by one or more elements of mobile network 100, as discussed for various embodiments described herein.

In at least one embodiment, at 1002, the operations may include capturing and storing information (e.g., parameters, attributes, etc.) associated with a plurality of UE sessions of a plurality of UEs. In at least one embodiment, the information may be captured for the plurality of UE sessions via SGW 106, PGW 108, MME 104, PCRF 110, etc. and stored in database 132 via anomaly detection application 130.

At 1004, the operations may include detecting an anomaly associated with at least one UE session of at least one UE. In at least one embodiment, the anomaly may be detected by anomaly detection application 130 based on historical information for the plurality of UE sessions stored in database 132. In another embodiment, detecting an anomaly may include predicting a potential anomaly or issue for the at least one UE session based on decision tree analysis performed at one or more data-path network elements via decision tree logic (e.g., SGW 106 and/or PGW 108). In still some embodiments, detecting an anomaly may include detecting an anomaly via an anomaly detection application provided for one or more data-path network elements (e.g., SGW 106 and/or PGW 108).

At 1006, the operations may include automatically activating a trace for the at least one UE session at one or more data-path network elements based, at least in part, on detecting the anomaly associated with the at least one UE session. In at least one embodiment, the trace may be activated by anomaly detection application 130 by communicating a notification to SGW 106 and/or PGW 108, via corresponding REST APIs 134 for each of SGW 106 and/or PGW 108, to activate the trace for the at least one UE session. In another embodiment, activating the trace for the at least one UE session may include activating the trace by a first data-path network element based on intelligent tracing and packet capturing operations, as discussed herein. In still some embodiments, activating the trace for the at least one UE session may include activating the trace by a first data-path network element based on proactive tracing and packet capturing operations performed by the first network element (e.g., via an anomaly detection application configured for the first data-path network element).

In at least one embodiment, as shown at 1008, the operations may include communicating, from a first data-path network element to a second data-path network element, a GTP-U encapsulated data packet that includes an indication of the activated trace for the at least one UE session in a GTP-U extension header.

Accordingly, techniques as described herein may be implemented by mobile network 100 to provide for the ability to proactively and intelligently providing tracing and packet capturing for one or more UE sessions that may be experiencing an anomaly and/or for which an anomaly or issue may be predicted.

Figure 11:
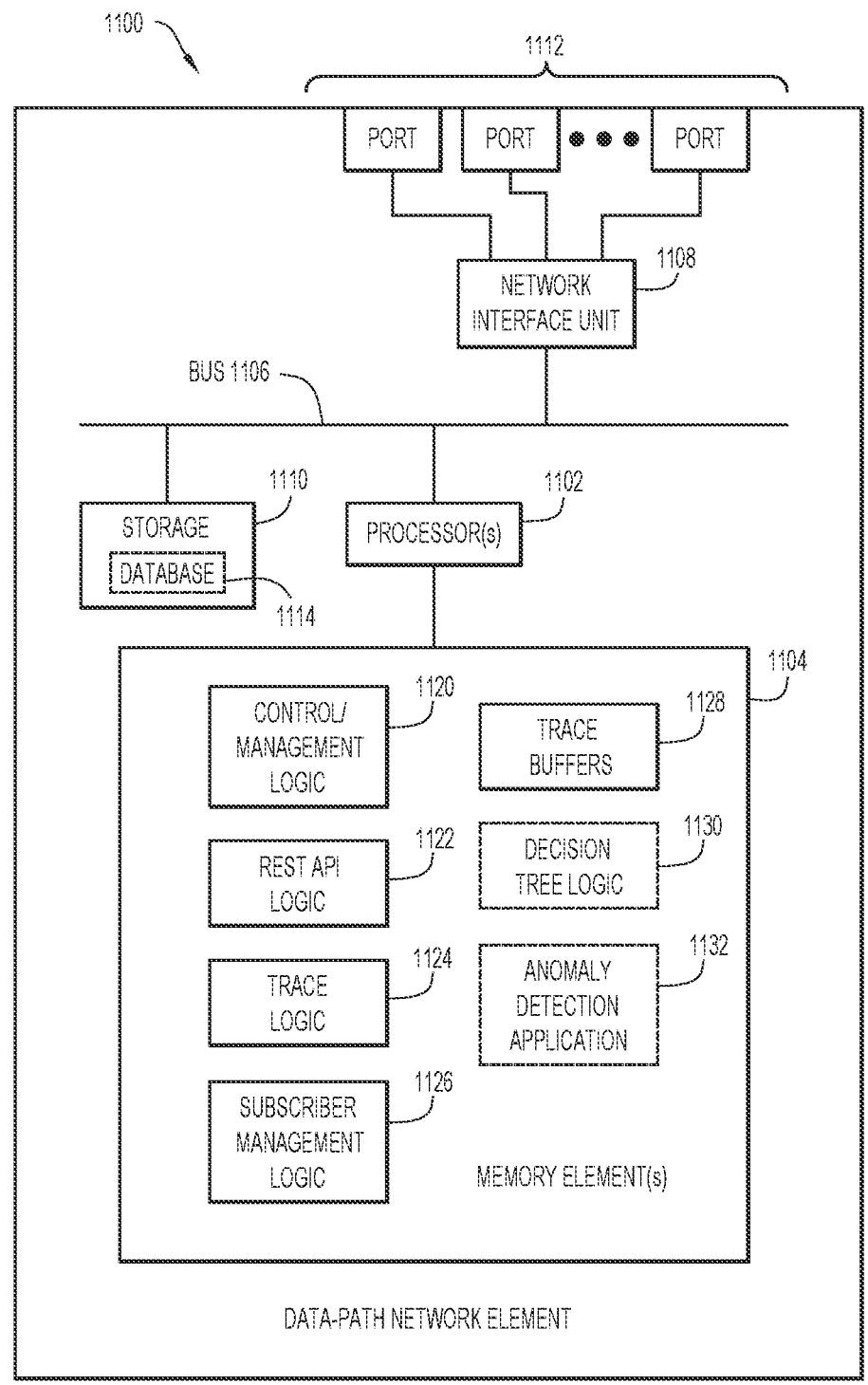
FIG. 11 is a simplified block diagram illustrating example details associated with a data-path network element for implementing operations described herein, according to an example embodiment.

Referring to FIG. 11, FIG. 11 is a simplified block diagram illustrating example details associated with a data-path network element 1100 for implementing operations described herein, according to an example embodiment. In various embodiments, data-path network element 1100 may be any SGW (e.g., SGW 106), PGW (e.g., PGW 108) or any other data-path network element that may be provided for a mobile network, such as mobile network 100 (e.g., UPF, etc.).

The embodiment of FIG. 11 illustrates data-path network element 1100, which includes one or more processor(s) 1102, one or more memory element(s) 1104, a bus 1106, a network interface unit 1108, and storage 1110. Memory element(s) 1104 may include instructions for control/management logic 1120, REST API logic 1122, trace logic 1124, and subscriber management logic 1126. Memory element(s) 1104 can also include memory allocated for trace operations, such as trace buffers 1128. In some embodiments, memory element(s) 1104 may also include instructions for decision tree logic 1130 and/or an anomaly detection application 1132. In some embodiments, storage 1110 may include a database 1114, for example, to store historical information for UE sessions, which may be used by anomaly detection application 1132, if configured for data-path network element 1100.

In at least one embodiment, processor(s) 1102 is/are at least one hardware processor configured to execute various tasks, operations, and/or functions for data-path network element 1100 as described herein according to software and/or instructions configured for data-path network element 1100. In at least one embodiment, memory element(s) 1104 is/are configured to store data, information, software and/or instructions associated with data-path network element 1100 and logic configured for memory element(s) 1104. In at least one embodiment, bus 1106 can be configured as an interface that enables one or more elements of data-path network element 1100 (e.g., network interface unit 1108, processor(s) 1102, memory element(s) 1104 (and logic, applications, etc. configured therein), etc. to communicate in order to exchange information and/or data. In at least one embodiment, a fast kernel-hosted interconnect may be employed for data-path network element 1100, potentially using shared memory between processes (e.g., logic, etc.), which can enable efficient communication paths between the processes. In various embodiments, network interface unit 1108 enables communication between data-path network element 1100 and other network elements or nodes, via one or more ports 1112 at which traffic is received and transmitted to facilitate operations discussed for various embodiments described herein. In some embodiments, network interface unit 1108 can be configured with one or more Ethernet driver(s) and/or controller(s) or other similar network interface driver(s) and/or controller(s) (wired or wireless) (e.g., Fibre Channel, WiFi, etc.) to enable communications for data-path network element 1100 within mobile network 100. Data-path network element 1100 can include any suitable interfaces for receiving, transmitting, and/or otherwise communicating data or information in a network environment.

In various embodiments, storage 1110 can be configured to store data, information and/or instructions associated with data-path network element 1100 (e.g., via database 1114) and/or logic configured for memory element(s) 1104. Note that in certain examples, storage 1110 can be consolidated with memory element(s) 1104 (or vice versa), and/or the storage/memory elements can overlap/exist in any other suitable manner.

In at least one embodiment, control/management logic 1120 can include instructions that, when executed (e.g., by processor(s) 1102 cause data-path network element 1100 to perform operations, which can include, but not be limited to, performing control plane, management plane, and/or data plane management/processing operations associated with data-path network element 1100, as discussed herein, including various GTP-U data packet related operations; cooperating and/or interacting with other logic; maintaining and/or interacting with stored data, information, parameters; combinations thereof; and/or the like to facilitate various operations as discussed for various embodiments described herein.

In at least one embodiment, REST API logic 1122 can include instructions that, when executed (e.g., by processor(s) 1102) cause data-path network element 1100 to perform operations, which can include, but not be limited to, facilitating communications/exchanges with an anomaly detection application external to data-path network element 1100 for capturing parameters and/or attributes for UE sessions, triggering trace activation and packet capturing for one or more UE sessions, deactivating tracing and packet capturing for one or more UE sessions, changing a level or intensity of tracing for tracing and packet capturing for one or more UE sessions, etc., as discussed herein; cooperating and/or interacting with other logic; maintaining and/or interacting with stored data, information, parameters; combinations thereof; and/or the like to facilitate various operations as discussed for various embodiments described herein.

In at least one embodiment, trace logic 1124 and subscriber management logic 1126 can include instructions that, when executed (e.g., by processor(s) 1102) cause data-path network element 1100 to perform operations, which can include, but not be limited to, providing tracing and packet capturing operations for one or more UE sessions, as discussed herein, cooperating and/or interacting with other logic; maintaining and/or interacting with stored data, information, parameters; combinations thereof; and/or the like to facilitate various operations as discussed for various embodiments described herein.

In at least one embodiment, decision tree logic 1130 can include instructions that, when executed (e.g., by processor(s) 1102) cause data-path network element 1100 to perform operations, which can include, but not be limited to, providing decision tree operations, as discussed herein, cooperating and/or interacting with other logic; maintaining and/or interacting with stored data, information, parameters; combinations thereof; and/or the like to facilitate various operations as discussed for various embodiments described herein.

In at least one embodiment, anomaly detection application 1132 can include instructions that, when executed (e.g., by processor(s) 1102) cause data-path network element 1100 to perform operations, which can include, but not be limited to, providing anomaly detection operations, as discussed herein, cooperating and/or interacting with other logic; maintaining and/or interacting with stored data, information, parameters; combinations thereof; and/or the like to facilitate various operations as discussed for various embodiments described herein.

In various embodiments, memory element(s) 1104 may include any suitable memory element such as random access memory (RAM), dynamic RAM (DRAM), static RAM (SRAM), and cache memory. In general, memory element(s) 1104 can include any suitable volatile or non-volatile computer readable storage media, which may be inclusive of one or more non-transitory tangible media and/or one or more non-transitory computer readable storage media that is capable of storing program/logic/software instructions and/or digital information.

In various embodiments, storage 1110 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of one or more non-transitory tangible media and/or one or more non-transitory computer readable storage media, that is capable of storing program/logic/software instructions and/or digital information. In some embodiments, the media used by storage 1110 may also be removable. For example, a removable hard drive may be used for storage 1110. Other examples include optical and magnetic disks, thumb drives, and smart cards that are inserted into a drive for transfer onto another computer readable storage medium that is also part of storage 1110.

Figure 12:
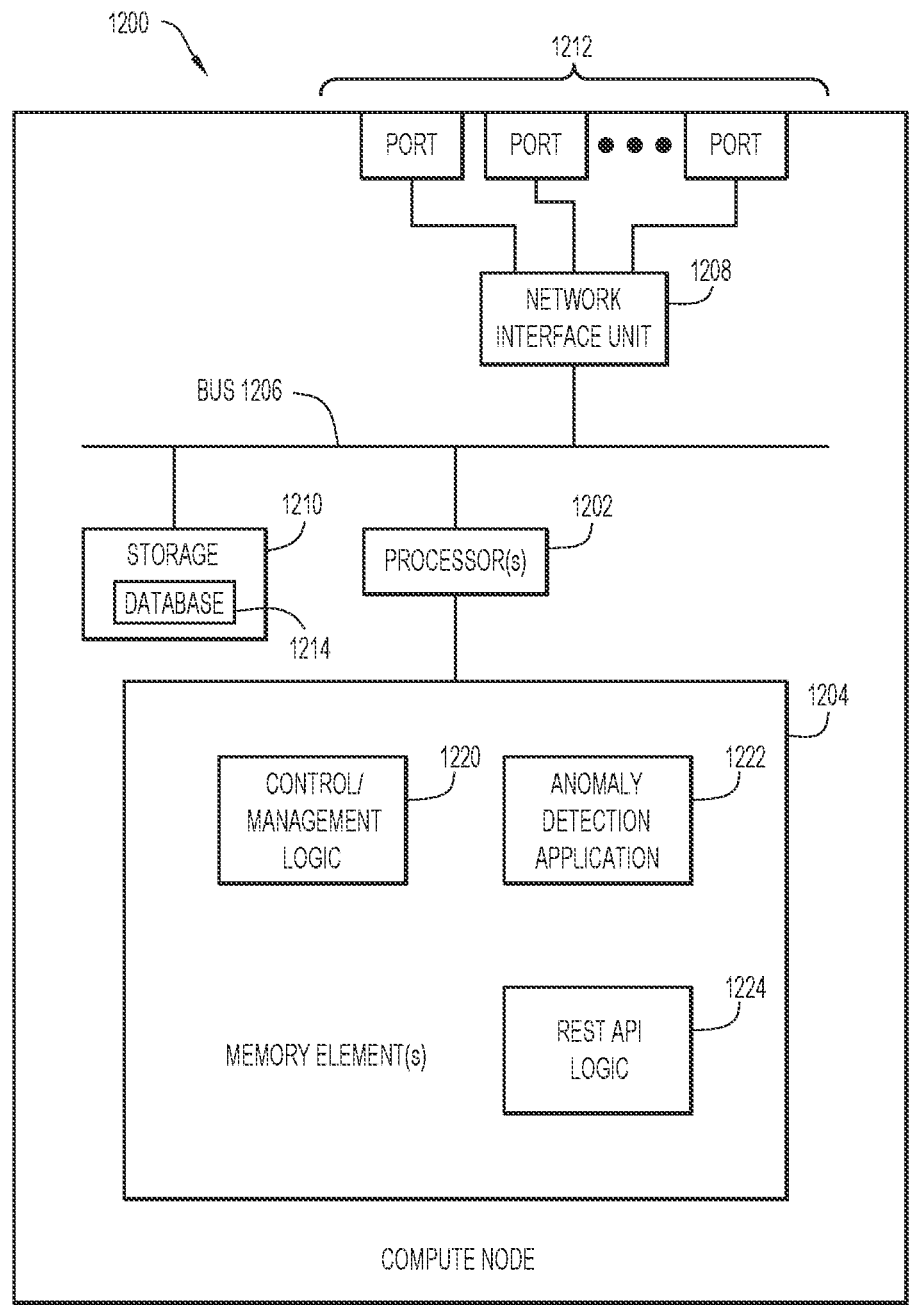
FIG. 12 is a simplified block diagram illustrating example details associated with a compute node for implementing operations described herein, according to an example embodiment.

Referring to FIG. 12, FIG. 12 is a simplified block diagram illustrating example details associated with a compute node 1200 for implementing operations described herein, according to an example embodiment. In various embodiments, compute node 1200 may be any network management element, SDN controller, NPU manager, Cisco® DNAC, or the like that may be provided for a mobile network, such as mobile network 100 (e.g., compute node 150 and anomaly detection application 130).

The embodiment of FIG. 12 illustrates compute node 1200, which includes one or more processor(s) 1202, one or more memory element(s) 1204, a bus 1206, a network interface unit 1208, and storage 1210. Memory element(s) 1204 may include instructions for control/management logic 1220, an anomaly detection application 1222, and REST API logic 1224. Storage 1214 may include a database to store historical information for UE sessions, to be used by anomaly detection application 1222, for anomaly detection operations, as discussed herein.

In at least one embodiment, processor(s) 1202 is/are at least one hardware processor configured to execute various tasks, operations, and/or functions for compute node 1200 as described herein according to software and/or instructions configured for compute node 1200. In at least one embodiment, memory element(s) 1204 is/are configured to store data, information, software and/or instructions associated with compute node 1200 and logic configured for memory element(s) 1204. In at least one embodiment, bus 1206 can be configured as an interface that enables one or more elements of compute node 1200 (e.g., network interface unit 1208, processor(s) 1202, memory element(s) 1204 (and logic, applications, etc. configured therein), etc. to communicate in order to exchange information and/or data. In at least one embodiment, a fast kernel-hosted interconnect may be employed for compute node 1200, potentially using shared memory between processes, which can enable efficient communication paths between the processes. In various embodiments, network interface unit 1208 enables communication between compute node 1200, other compute nodes, via one or more ports 1212 at which traffic is received and transmitted to facilitate operations discussed for various embodiments described herein. In some embodiments, network interface unit 1208 can be configured with one or more Ethernet driver(s) and/or controller(s) or other similar network interface driver(s) and/or controller(s) (wired or wireless) (e.g., Fibre Channel, WiFi, etc.) to enable communications for compute node 1200 within mobile network 100. Compute node 1200 can include any suitable interfaces for receiving, transmitting, and/or otherwise communicating data or information in a network environment.

In various embodiments, storage 1210 can be configured to store data, information and/or instructions associated with compute node 1200 and/or logic configured for memory element(s) 1204. Note that in certain examples, storage 1210 can be consolidated with memory element(s) 1204 (or vice versa), and/or the storage/memory elements can overlap/ exist in any other suitable manner.

In at least one embodiment, control/management logic 1220 can include instructions that, when executed (e.g., by processor(s) 1202) cause compute node 1200 to perform operations, which can include, but not be limited to, performing control plane, management plane, and/or data plane operations associated with compute node 1200, as discussed herein, cooperating and/or interacting with other logic; maintaining and/or interacting with stored data, information, parameters; combinations thereof; and/or the like to facilitate various operations as discussed for various embodiments described herein.

In at least one embodiment, REST API logic 1224 can include instructions that, when executed (e.g., by processor(s) 1202) cause compute node 1200 to perform operations, which can include, but not be limited to, facilitating communications/exchanges with one or more network elements for capturing parameters and/or attributes for UE sessions, triggering trace activation and packet capturing for one or more UE sessions, deactivating tracing and packet capturing for one or more UE sessions, changing a level or intensity of tracing and packet capturing for one or more UE sessions, etc. as discussed herein; cooperating and/or interacting with other logic; maintaining and/or interacting with stored data, information, parameters; combinations thereof; and/or the like to facilitate various operations as discussed for various embodiments described herein.

In at least one embodiment, anomaly detection application 1222 can include instructions that, when executed (e.g., by processor(s) 1202) cause compute node 1200 to perform operations, which can include, but not be limited to, providing anomaly detection operations to determine whether to trigger a trace activation, deactivation, and/or deactivation for one or more UE sessions based on detected anomalies, providing lists of UEs for which tracing related actions are to be performed, among other operations as discussed herein; cooperating and/or interacting with other logic; maintaining and/or interacting with stored data, information, parameters; combinations thereof; and/or the like to facilitate various operations as discussed for various embodiments described herein.

In various embodiments, memory element(s) 1204 may include any suitable memory element such as RAM, DRAM, SRAM, and cache memory. In general, memory element(s) 1204 can include any suitable volatile or non-volatile computer readable storage media, which may be inclusive of one or more non-transitory tangible media and/or one or more non-transitory computer readable storage media that is capable of storing program/logic/software instructions and/or digital information.

In various embodiments, storage 1210 may include any suitable storage such as persistent storage, which may be a magnetic disk drive, a solid state hard drive, a semiconductor storage device, ROM, an EPROM, flash memory, or any other computer readable storage media, which may be inclusive of one or more non-transitory tangible media and/or one or more non-transitory computer readable storage media, that is capable of storing program/logic/software instructions and/or digital information. In some embodiments, the media used by storage 1210 may also be removable. For example, a removable hard drive may be used for storage 1210. Other examples include optical and magnetic disks, thumb drives, and smart cards that are inserted into a drive for transfer onto another computer readable storage medium that is also part of storage 1210.

Figure 13:
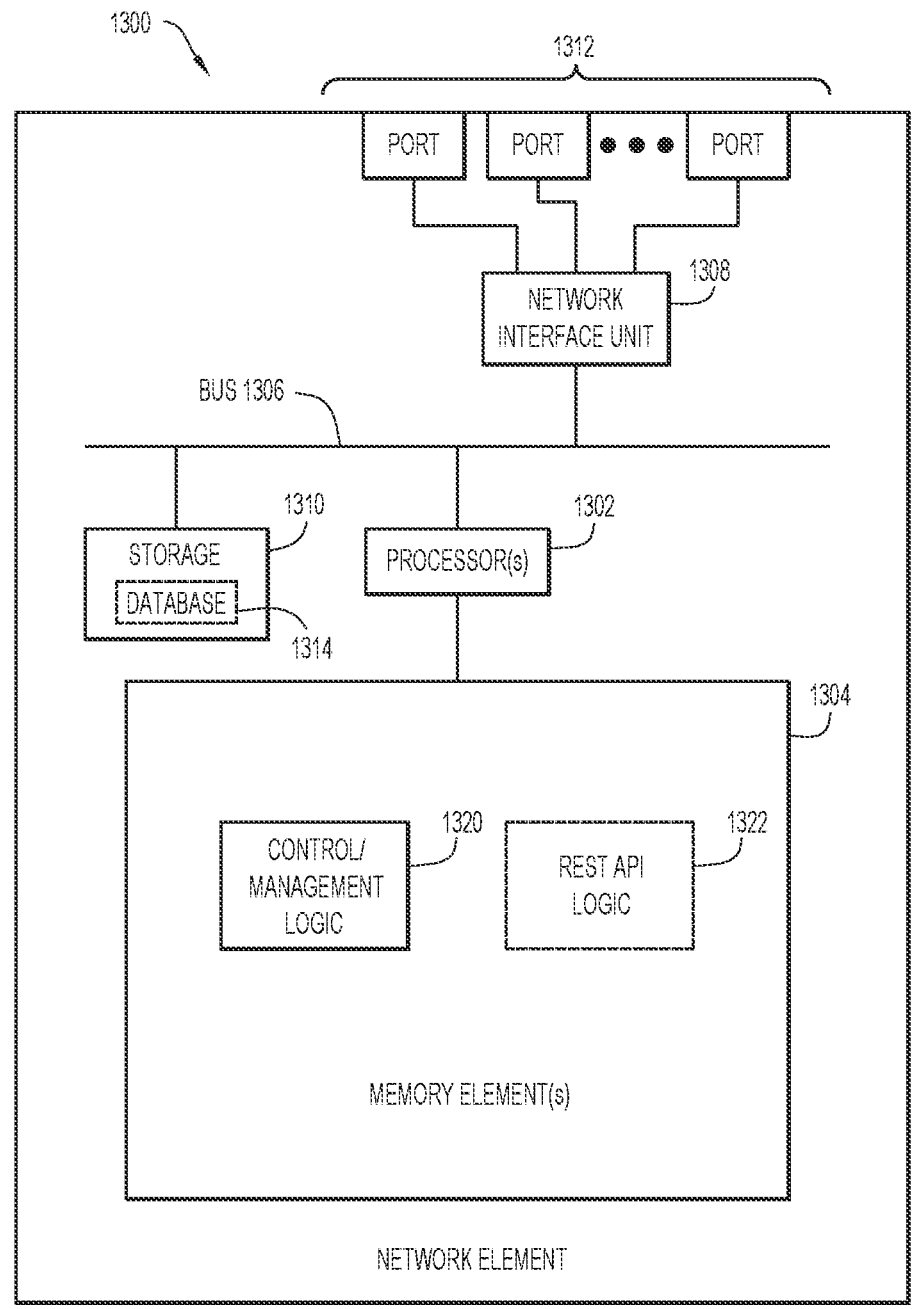
FIG. 13 is a simplified block diagram illustrating example details associated with a network element for implementing operations described herein, according to an example embodiment.

Referring to FIG. 13, FIG. 13 is a simplified block diagram illustrating example details associated with a network node/element 1300 for implementing operations described herein, according to an example embodiment. In various embodiments, network element 1300 may be any node/network element such as an MME (e.g., MME 104), PCRF (e.g., PCRF 110), AAA server (e.g., AAA server 112), HSS (e.g., HSS 114), or any other node/network element that may be provided for a mobile network, such as mobile network 100.

The embodiment of FIG. 13 illustrates network element 1300, which includes one or more processor(s) 1302, one or more memory element(s) 1304, a bus 1306, a network interface unit 1308, and storage 1310. Memory element(s) 1304 may include instructions for control/management logic 1320. In some embodiments, memory element(s) 1304 may also include instructions for REST API logic 1322. In some embodiments, storage 1310 may include a database 1314, for example, a location database, etc.

In at least one embodiment, processor(s) 1302 is/are at least one hardware processor configured to execute various tasks, operations, and/or functions for network element 1300 as described herein according to software and/or instructions configured for network element 1300. In at least one embodiment, memory element(s) 1304 is/are configured to store data, information, software and/or instructions associated with network element 1300 and logic configured for memory element(s) 1304. In at least one embodiment, bus 1306 can be configured as an interface that enables one or more elements of network element 1300 (e.g., network interface unit 1308, processor(s) 1302, memory element(s) 1304 (and logic, applications, etc. configured therein), etc. to communicate in order to exchange information and/or data. In at least one embodiment, a fast kernel-hosted interconnect may be employed for network element 1300, potentially using shared memory between processes (e.g., logic, etc.), which can enable efficient communication paths between the processes. In various embodiments, network interface unit 1308 enables communication between network element 1300 and other network elements or nodes, via one or more ports 1312 at which traffic is received and transmitted to facilitate operations discussed for various embodiments described herein. In some embodiments, network interface unit 1308 can be configured with one or more Ethernet driver(s) and/or controller(s) or other similar network interface driver(s) and/or controller(s) (wired or wireless) (e.g., Fibre Channel, WiFi etc.) to enable communications for network element 1300 within mobile network 100. Network element 1300 can include any suitable interfaces for receiving, transmitting, and/or otherwise communicating data or information in a network environment.

In various embodiments, storage 1310 can be configured to store data, information and/or instructions associated with network element 1300 and/or logic configured for memory element(s) 1304. Note that in certain examples, storage 1310 can be consolidated with memory element(s) 1304 (or vice versa), and/or the storage/memory elements can overlap/ exist in any other suitable manner.

In at least one embodiment, control/management logic 1320 can include instructions that, when executed (e.g., by processor(s) 1302) cause network element 1300 to perform operations, which can include, but not be limited to, performing control and management operations associated with network element 1300, as discussed herein, cooperating and/or interacting with other logic; maintaining and/or interacting with stored data, information, parameters; combinations thereof; and/or the like to facilitate various operations as discussed for various embodiments described herein.

In at least one embodiment, REST API logic 1322 can include instructions that, when executed (e.g., by processor(s) 1302) cause network element 1300 to perform operations, which can include, but not be limited to, facilitating communications/exchanges with an anomaly detection application (e.g., anomaly detection application 130) for capturing parameters and/or attributes for UE sessions and/or any other operations, as discussed herein; cooperating and/or interacting with other logic; maintaining and/or interacting with stored data, information, parameters; combinations thereof; and/or the like to facilitate various operations as discussed for various embodiments described herein.

In various embodiments, memory element(s) 1304 may include any suitable memory element such as RAM, DRAM, SRAM, and cache memory. In general, memory element(s) 1304 can include any suitable volatile or non-volatile computer readable storage media, which may be inclusive of one or more non-transitory tangible media and/or one or more non-transitory computer readable storage media that is capable of storing program/logic/software instructions and/or digital information.

In various embodiments, storage 1310 may include any suitable storage such as persistent storage, which may be a magnetic disk drive, a solid state hard drive, a semiconductor storage device, ROM, an EPROM, flash memory, or any other computer readable storage media, which may be inclusive of one or more non-transitory tangible media and/or one or more non-transitory computer readable storage media, that is capable of storing program/logic/software instructions and/or digital information. In some embodiments, the media used by storage 1310 may also be removable. For example, a removable hard drive may be used for storage 1310. Other examples include optical and magnetic disks, thumb drives, and smart cards that are inserted into a drive for transfer onto another computer readable storage medium that is also part of storage 1310.

In summary, techniques discussed for various embodiments described herein, which may be implemented via a mobile network, such as mobile network 100, may provide for the ability to perform anomaly detection based on historic UE activity and also automatically trigger packet capturing for UE/subscriber sessions without manual intervention of a network operator, or the like; thus, providing for the ability to capture packet information for UE sessions when needed, automatically. An anomaly detection application, as discussed for various embodiments described herein, may be configured for any compute node and/or network element (e.g., Cisco® DNAC, etc.). In addition, techniques discussed for various embodiments described herein provide for the ability to facilitate data-path based intelligent capture (e.g., using mechanisms to utilize internal counters/statistics/etc. and create decision trees) in addition to inputs (e.g., parameters and/or attributes captured for UE sessions) to facilitate anomaly detection application for triggering the tracing/packet capturing proactively and automatically.

In one form, a computer-implemented method may be provided and may include storing information associated with a plurality of user equipment (UE) sessions of a plurality of UEs within a mobile network; detecting an anomaly associated with at least one UE session of at least one UE based, at least in part, on the information stored for the at least one UE session; and activating a trace for the at least one UE session based, at least in part, on detecting the anomaly associated with the at least one UE session, wherein activating the trace comprises capturing packet information for a data packet flow associated with the at least one UE session at one or more data-path network elements of a plurality of data-path network elements within the mobile network.

In at least on embodiment, the method may include communicating, from a first data-path network element to a second data-path network element, a GTP-U encapsulated data plane packet that includes an indication of the activated trace for the at least one UE session in a GTP-U extension header.

In some embodiments, the detecting may further include detecting the anomaly associated with the at least one UE session by an anomaly detection application that is external to the plurality of data-path network elements in which the method may further include communicating the information associated with the plurality of UE sessions from a plurality of data-path network elements to the anomaly detection application via corresponding Representational State Transfer application programming interfaces (REST APIs) between each data-path network element of the plurality of data path network elements and the anomaly detection application. In at least one embodiment, activating the trace for the at least one UE session can further include communicating a trace activation notification to a first data-path network element from the anomaly detection application via a first REST API, wherein the first data-path network element is a packet data network gateway (PGW) and communicating a trace activation notification to a second data-path network element from the anomaly detection application via a second REST API, wherein the second data-path network element is a serving gateway (SGW).

In some embodiments, the detecting may further include detecting anomalies for each of a plurality of other UE sessions based on the information stored for the plurality of UE sessions wherein each of the first trace activation notification and the second trace activation notification comprises a list comprising an International Mobile Subscriber Identity (IMSI) for each of the at least one UE session and the plurality of other UE sessions for which anomalies are detected.

In various embodiments, the stored information associated with the plurality of UE sessions may include an International Mobile Subscriber Identity (IMSI) for each of the plurality of UEs; location information for each of the plurality of UEs; Radio Access Technology (RAT) type information for each of the plurality of UEs; call termination information for the each of the plurality of UEs; and timestamp information for each of the plurality of UEs.

In various embodiments, the anomaly associated with at least one UE session of the at least one UE is detected based on at least one of: determining, based on RAT type information and timestamp information of the at least one UE session, frequent RAT type switches for a period of time of the at least one UE; determining, based on location information of the at least one UE, that the at least one UE is in an abnormal location; determining, based on location information of the at least one UE, that the at least one UE is entering a cell area at which other UE sessions are experiencing an anomaly; determining, based on call termination information and timestamp information for the at least one UE, frequent call terminations for a period of time for the at least one UE; and/or determining, based on timestamp information for the at least one UE, frequent session establishment rejections for the at least one UE. In some embodiments, the method may further include deactivating and/or changing a level or intensity of tracing for one or more UE sessions.

In some embodiments, the information stored for the plurality of UE sessions may be stored in a database associated with the anomaly detection application. In still some embodiments, the method may include refreshing the database to remove information for one or more UE sessions in order to avoid the database growing unconditionally. In some embodiments, the refreshing may be performed after a configured period of time, after successful call establishment for a UE, combinations thereof, and/or the like. In some embodiments, the anomaly detection application may be part of a compute node or network management entity.

In still some embodiments, the detecting may further include detecting the anomaly by an anomaly detection application that is configured for at least one data-path network element, wherein the information for the plurality of UE sessions is stored within a database configured for storage and/or memory for the at least data-path network element.

In some embodiments, the detecting may further include predicting, at a first data-path network element, a potential anomaly associated with at least one other UE session in which the predicting may further include: analyzing operational data associated with the at least one UE session using a decision tree associated with the at least one UE session configured for the first data-path network element; and determining one or more tracing related actions for the at least one UE session based on the analyzing. In at least one embodiment, the decision tree may include a number of leaf nodes.

In at least one embodiment, a plurality of decision tree instances may be provided in which each decision tree is associated with data packet flow for a particular UE session. In at least one embodiment, the decision tree instances may be executed in the management plane of the first data-path network element to reduce packet processing overheads. In some embodiments, one or more decision trees can be applied to any logical and/or physical construct such as entire ports or VLANs.

In various embodiments, the one or more tracing related actions may include one or more of: activating a trace for the at least one other UE session; deactivating a trace previously activated for the at least one other UE session; and changing a level of a trace previously activated for the at least one other UE session. In at least one embodiment, a tracing related action may be executed for the first data-path network element by making a local request through the management plane of the data-path network element by a parent decision tree non-leaf node of the decision tree to trace logic configured for the first data-path network element to perform the one or more tracing related actions. In at least one embodiment, the method may further include configuring, based on the request, the trace logic to recognize the data-packet flow for the at least one other UE session.

In some embodiments, changing a level of a trace may include changing the level to one of: no trace, light trace, medium trace, or full trace based on an output color of a decision tree node. In some embodiments, changing a level of a trace may include changing the level based on evaluations of one or more thresholds of a scale in which breaching a threshold by up to a certain percentage (e.g., 25%) yields a light tracing decision, whereas breaching the threshold by more than another, higher level, percentage (e.g., 75%) yields a strong tracing decision. In some embodiments changing a level of a trace may include changing the amount and/or type of information that is captured for a packet (e.g., full packet information, packet header information, packet processing information, combinations thereof, etc.) and/or changing the amount of data packets of a packet flow (e.g., capturing all data packets of a packet flow, capturing bursts of data packets, combinations thereof, etc.).

In various embodiments, the operational data may include one or more of count data associated with one or more packet processing operations; packet drop statistics for data packet flows handled by the first network element; network address information included in data packet flows handled by the first network element; Layer 3 (L3) and/or other network addresses, metadata from exception scenarios and a percentage of data packet flows handled by the first network element that are experiencing errors.

In at least one embodiment, the method may further include communicating the one or more tracing related actions from the first data-path network element to a second data-path network element using a user plane General Packet Radio Service (GPRS) Tunneling Protocol (GTP-U) extension header of a GTP-U header of at least one GTP-U encapsulated data packet communicated from the first data-path network element to the second data-path network element.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node or a network element can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for mobile networks such as those illustrated in FIG. 1).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, mobile network 100 may implement user datagram protocol/Internet Protocol (UDP/IP) connections and/or transmission control protocol/IP (TCP/IP) communication language protocol in particular embodiments of the present disclosure. However, mobile network 100 can alternatively implement any other suitable communication protocol, interface and/or standard, proprietary and/or non-proprietary, for transmitting and receiving messaging and/or signaling. Other protocols, interfaces and/or communication standards that can be used in mobile network 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

In various embodiments, mobile network 100 can represent a series of points or elements of interconnected communication paths (wired or wireless) for receiving and transmitting packets of information that propagate through mobile network 100. In various embodiments, mobile network 100 can be associated with and/or provided by a single network operator or service provider and/or multiple network operators or service providers. In various embodiments, mobile network 100 can include and/or overlap with, in whole or in part, one or more packet data network(s). Mobile network 100 may offer communicative interfaces between various elements of mobile network 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A mobile network, such as mobile network 100, through which communications propagate in can use any suitable technologies for communication including wireless (e.g., 3G/4G/5G/nG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding FIGs. illustrate only some of the possible scenarios that may be executed by, or within, a mobile network (e.g., mobile network 100). Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
   storing historical information for a session of a user equipment (UE) within a mobile network;
   detecting an anomaly associated with the session of the UE based on the historical information stored for the session of the UE; and
   activating a first trace for the session of the UE at a first data-path network element based on detecting the anomaly associated with the session of the UE, wherein activating the first trace comprises communicating a first trace activation notification to the first data-path network element, wherein the first trace activation notification causes the first data-path network element to capture packet information for a data packet flow associated with the session of the UE and causes the first data-path network element to activate a second trace for the session of the UE at a second data-path network element via a second trace activation notification that is to be included in an extension header for at least one encapsulated packet, the at least one encapsulated packet to be communicated from the first data-path network element to the second data-path network element.

2. The method of claim 1, wherein the first data-path network element at which the first trace is activated is one of:
   a serving gateway (SGW); or
   a packet data network gateway (PGW).

3. The method of claim 1, wherein the detecting is performed by an anomaly detection application that is external to the first data-path network element and the second data-path network element.

4. The method of claim 3, wherein the historical information stored for the session of the UE is obtained from one or more control plane network elements of the mobile network or one or more user plane network elements of the mobile network.

5. The method of claim 1, wherein the first trace activation notification comprises an identifier for the session of the UE and a tracing level indicator for the first trace.

6. The method of claim 1, wherein the historical information stored for the session of the UE further comprises:
   an International Mobile Subscriber Identity (IMSI) for the UE;
   location information for the UE;
   Radio Access Technology (RAT) type information for the session of the UE;
   call termination information for the UE; and
   timestamp information for one or more events associated with the session of the UE.

7. The method of claim 6, wherein the anomaly associated with the session of the UE is detected based on at least one of:
   determining, based on the RAT type information and the timestamp information, frequent RAT type switches for a period of time;
   determining, based on the location information, that the UE is in an abnormal location;
   determining, based on the location information, that the UE is entering a cell area associated with anomalies;

determining, based on the call termination information for the UE and the timestamp information for one or more events associated with the session of the UE, frequent call terminations for a period of time; and determining, based on the timestamp information, frequent session establishment rejections.

8. The method of claim 1,
wherein the extension header is a user plane General Packet Radio Service (GPRS) Tunneling Protocol (GTP-U) extension header and the at least one encapsulated packet is at least one GTP-U encapsulated data packet.

9. The method of claim 8,
wherein the GTP-U extension header includes a first content field comprising an indicator for the second trace activation notification.

10. One or more non-transitory computer readable storage media encoded with instructions that, when executed by a processor, cause the processor to perform operations, comprising:

storing historical information for a session of a user equipment (UE) within a mobile network;

detecting an anomaly associated with the session of the UE based, at least in part, on the historical information stored for the session of the UE; and activating a first trace for the session of the UE at a first data-path network element based on detecting the anomaly associated with the session of the UE, wherein activating the first trace comprises communicating a first trace activation notification to the first data-path network element, wherein the first trace activation notification causes the first data-path network element to capture packet information for a data packet flow associated with the session of the UE and causes the first data-path network element to activate a second trace for the session of the UE at a second data-path network element via a second trace activation notification that is to be included in an extension header for at least one encapsulated packet, the at least one encapsulated packet to be communicated from the first data-path network element to the second data-path network element.

11. The media of claim 10, wherein the detecting is performed by an anomaly detection application that is external to the first data-path network element and the second data-path network element.

12. The media of claim 11, wherein the historical information stored for the session of the UE is obtained from one or more control plane network elements of the mobile network or one or more user plane network elements of the mobile network.

13. The media of claim 10, wherein the first trace activation notification comprises an identifier for the session of the UE and a tracing level indicator for the first trace.

14. The media of claim 10, wherein the historical information stored for the session of the UE further comprises:

an International Mobile Subscriber Identity (IMSI) for the UE;

location information for the UE;

Radio Access Technology (RAT) type information for the session of the UE;

call termination information; and timestamp information.

15. The media of claim 10, wherein the extension header is a user plane General Packet Radio Service (GPRS) Tunneling Protocol (GTP-U) extension header and the at least one encapsulated packet is at least one GTP-U encapsulated data packet.

16. The media of claim 15,
wherein the GTP-U extension header includes a first content field comprising an indicator for the second trace activation notification.

17. A system comprising:
at least one memory element for storing data; and
at least one processor for executing instructions associated with the data, wherein executing the instructions causes the system to perform operations, comprising:

storing historical information for a session of a user equipment (UE) session within a mobile network;

detecting an anomaly associated with the session of the UE based on the historical information stored for the session of the UE; and activating a first trace for the session of the UE at a first data-path network element based on detecting the anomaly associated with the session of the UE, wherein activating the first trace comprises communicating a first trace activation notification to the first data-path network element, wherein the first trace activation notification causes the first data-path network element to capture packet information for a data packet flow associated with the session of the UE and causes the first data-path network element activate a second trace for the session of the UE at a second data-path network element via a second trace activation notification that is to be included in an extension header for at least one encapsulated packet, the at least one encapsulated packet to be communicated from the first data-path network element to the second data-path network element.

18. The system of claim 17, wherein the first data-path network element at which the first trace is activated is one of:

a serving gateway (SGW); or a packet data network gateway (PGW).

19. The system of claim 17, wherein the detecting is performed by an anomaly detection application that is external the first data-path network element and the second data-path network element.

20. The system of claim 17, wherein the extension header is a user plane General Packet Radio Service (GPRS) Tunneling Protocol (GTP-U) extension header and the at least one encapsulated packet is at least one GTP-U encapsulated data packet.

* * * * *

UNITED STATES PATENT AND TRADEMARK OFFICE
CERTIFICATE OF CORRECTION

PATENT NO. : 11,271,831 B2
APPLICATION NO. : 16/743147
DATED : March 8, 2022
INVENTOR(S) : Santosh Ramrao Patil et al.

It is certified that error appears in the above-identified patent and that said Letters Patent is hereby corrected as shown below:

In the Claims

Claim 17, Column 46, Line 21, please delete "session".

Signed and Sealed this
Nineteenth Day of April, 2022

Katherine Kelly Vidal
*Director of the United States Patent and Trademark Office*